United States Patent
Kushner et al.

(10) Patent No.: US 11,295,297 B1
(45) Date of Patent: Apr. 5, 2022

(54) SYSTEMS AND METHODS FOR PUSHING USABLE OBJECTS AND THIRD-PARTY PROVISIONING TO A MOBILE WALLET

(71) Applicant: Wells Fargo Bank, N.A., San Francisco, CA (US)

(72) Inventors: Kristine Ing Kushner, Orinda, CA (US); Laurence Poirier, La Honda, CA (US); Ramanathan Ramanathan, Bellevue, WA (US); John Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 521 days.

(21) Appl. No.: 15/905,566

(22) Filed: Feb. 26, 2018

(51) Int. Cl.
*G06Q 20/36* (2012.01)
*G06Q 20/32* (2012.01)
*G06Q 20/40* (2012.01)

(52) U.S. Cl.
CPC ........ *G06Q 20/3674* (2013.01); *G06Q 20/322* (2013.01); *G06Q 20/3278* (2013.01); *G06Q 20/405* (2013.01)

(58) Field of Classification Search
CPC ........... G06Q 20/3674; G06Q 20/3278; G06Q 20/322; G06Q 20/405
USPC ....................................................... 705/41
See application file for complete search history.

(56) References Cited

U.S. PATENT DOCUMENTS

| | | | |
|---|---|---|---|
| 5,412,192 A | 5/1995 | Hoss | |
| 5,778,067 A | 7/1998 | Jones et al. | |
| 6,016,484 A | 1/2000 | Williams et al. | |
| 6,018,724 A | 1/2000 | Arent | |

(Continued)

FOREIGN PATENT DOCUMENTS

| | | |
|---|---|---|
| WO | WO-2011/113121 A1 | 9/2011 |
| WO | WO-2012/139003 A2 | 10/2012 |

(Continued)

OTHER PUBLICATIONS

A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).

(Continued)

*Primary Examiner* — Lindsay M Maguire
(74) *Attorney, Agent, or Firm* — Foley & Lardner LLP

(57) ABSTRACT

A computer-implemented method includes receiving, by a mobile wallet computing system, information relating to a usable object from a party and provisioning, by the mobile wallet computing system, the usable object to a mobile wallet associated with a user. The computer-implemented method further includes receiving, by the mobile wallet computing system, one or more rules relating to the usable object from the party, wherein the one or more rules define an activation condition for the usable object such that when the activation condition is fulfilled the usable object is active in the mobile wallet of the user; determining, by the mobile wallet computing system, whether the activation condition is (Continued)

fulfilled; and in response to the activation condition for the usable object being fulfilled, activating, by the mobile wallet computing system, the usable object in the mobile wallet of the user.

18 Claims, 20 Drawing Sheets

(56) References Cited

U.S. PATENT DOCUMENTS

| | | |
|---|---|---|
| 6,615,194 B1 | 9/2003 | Deutsch et al. |
| 6,865,547 B1 | 3/2005 | Brake et al. |
| 6,873,974 B1 | 3/2005 | Schutzer |
| 7,765,481 B2 | 7/2010 | Dixon et al. |
| 7,822,206 B2 | 10/2010 | Birk et al. |
| 7,827,057 B1 | 11/2010 | Walker et al. |
| 7,909,243 B2 | 3/2011 | Merkow et al. |
| 7,930,225 B2 | 4/2011 | Wahlberg et al. |
| 7,945,776 B1 | 5/2011 | Atzmony et al. |
| 7,970,669 B1 | 6/2011 | Santos |
| 8,019,365 B2 | 9/2011 | Fisher |
| 8,078,140 B2 | 12/2011 | Baker et al. |
| 8,126,806 B1 | 2/2012 | Dimartino et al. |
| 8,160,959 B2 | 4/2012 | Rackley et al. |
| 8,215,560 B2 | 7/2012 | Granucci et al. |
| 8,280,788 B2 | 10/2012 | Perlman |
| 8,332,290 B1 | 12/2012 | Venturo et al. |
| 8,401,904 B1 | 3/2013 | Simakov et al. |
| 8,433,657 B2 | 4/2013 | Dinan |
| 8,452,257 B2 | 5/2013 | Granucci et al. |
| 8,467,766 B2 | 6/2013 | Rackley et al. |
| 8,468,587 B2 | 6/2013 | Blinn et al. |
| 8,489,067 B2 | 7/2013 | Rackley, III et al. |
| 8,504,699 B2 | 8/2013 | Vaughan et al. |
| 8,533,123 B2 | 9/2013 | Hart |
| 8,538,845 B2 | 9/2013 | Liberty |
| 8,548,908 B2 | 10/2013 | Friedman |
| 8,548,926 B2 | 10/2013 | Balistierri et al. |
| 8,555,361 B2 | 10/2013 | Nakhjiri et al. |
| 8,566,237 B2 | 10/2013 | Forzley |
| 8,566,239 B2 | 10/2013 | Arthur et al. |
| 8,577,803 B2 | 11/2013 | Chatterjee et al. |
| 8,615,468 B2 | 12/2013 | Varadarajan |
| 8,627,424 B1 | 1/2014 | O'Malley et al. |
| 8,639,621 B1 | 1/2014 | Ellis et al. |
| 8,645,971 B2 | 2/2014 | Carlson et al. |
| 8,676,704 B2 | 3/2014 | Ledbetter et al. |
| 8,700,729 B2 | 4/2014 | Dua |
| 8,706,628 B2 | 4/2014 | Phillips |
| 8,725,576 B2 | 5/2014 | Fisher |
| 8,725,577 B2 | 5/2014 | Fisher |
| 8,732,080 B2 | 5/2014 | Karim |
| 8,744,966 B1 | 6/2014 | Amacker et al. |
| 8,750,901 B1 | 6/2014 | Gupta et al. |
| 8,768,830 B1 | 7/2014 | Jorgensen et al. |
| 8,768,834 B2 | 7/2014 | Zacarias et al. |
| 8,774,781 B1 | 7/2014 | Speiser et al. |
| 8,781,955 B2 | 7/2014 | Scharner et al. |
| 8,831,677 B2 | 9/2014 | Villa-Real |
| 8,838,501 B1 | 9/2014 | Priebatsch |
| 8,843,125 B2 | 9/2014 | Kwon et al. |
| 8,843,417 B2 | 9/2014 | Hammad |
| 8,880,432 B2 | 11/2014 | Collins, Jr. |
| 8,924,246 B1 | 12/2014 | Chen et al. |
| 8,925,805 B2 | 1/2015 | Grigg et al. |
| 8,972,297 B2 | 3/2015 | Kay et al. |
| 8,977,251 B2 | 3/2015 | Grigg et al. |
| 8,989,712 B2 | 3/2015 | Wentker et al. |
| 9,020,836 B2 | 4/2015 | Fisher et al. |
| 9,026,460 B2 | 5/2015 | Grigg et al. |
| 9,027,109 B2 | 5/2015 | Wolberg-Stok et al. |
| 9,037,509 B1 | 5/2015 | Ellis et al. |
| 9,043,240 B2 | 5/2015 | Langus et al. |
| 9,098,190 B2 | 8/2015 | Zhou et al. |
| 9,177,307 B2 | 11/2015 | Ross et al. |
| 9,208,488 B2 | 12/2015 | Liberty |
| 9,218,624 B2 | 12/2015 | Moghadam |
| 9,256,876 B2 | 2/2016 | Vasant Akole et al. |
| 9,286,606 B2 | 3/2016 | Diamond |
| 9,324,068 B2 | 4/2016 | Soundararajan |
| 9,361,616 B2 | 6/2016 | Zhou et al. |
| 9,691,058 B2 | 6/2017 | Epler et al. |
| 9,704,157 B1 | 7/2017 | Ellis et al. |
| 9,741,051 B2 | 8/2017 | Carpenter et al. |
| 9,805,363 B1 | 10/2017 | Rudnick et al. |
| 10,140,615 B2 | 11/2018 | Carpenter et al. |
| 10,169,812 B1 | 1/2019 | Bajgier et al. |
| 10,380,596 B1 | 8/2019 | Butler et al. |
| 10,445,739 B1 | 10/2019 | Sahni et al. |
| 2002/0032602 A1 | 3/2002 | Lanzillo et al. |
| 2003/0028481 A1 | 2/2003 | Flitcroft et al. |
| 2003/0055785 A1 | 3/2003 | Lahiri |
| 2003/0056096 A1 | 3/2003 | Albert et al. |
| 2004/0230535 A1 | 11/2004 | Binder et al. |
| 2004/0236632 A1 | 11/2004 | Maritzen et al. |
| 2004/0254848 A1 | 12/2004 | Golan et al. |
| 2004/0260646 A1 | 12/2004 | Berardi et al. |
| 2005/0021401 A1 | 1/2005 | Postrel |
| 2005/0043997 A1 | 2/2005 | Sahota et al. |
| 2005/0077350 A1 | 4/2005 | Courtion et al. |
| 2005/0086492 A1 | 4/2005 | Nicodemus et al. |
| 2005/0125317 A1 | 6/2005 | Winkelman et al. |
| 2005/0138377 A1 | 6/2005 | First et al. |
| 2005/0184145 A1 | 8/2005 | Law et al. |
| 2005/0235363 A1 | 10/2005 | Hibbard et al. |
| 2006/0253335 A1 | 11/2006 | Keena et al. |
| 2007/0168354 A1 | 7/2007 | Ramer et al. |
| 2007/0174873 A1 | 7/2007 | Griggs |
| 2007/0199061 A1 | 8/2007 | Byres et al. |
| 2007/0244811 A1 | 10/2007 | Tumminaro |
| 2008/0005006 A1 | 1/2008 | Tritt et al. |
| 2008/0006685 A1 | 1/2008 | Rackley, III et al. |
| 2008/0033878 A1 | 2/2008 | Krikorian et al. |
| 2008/0040265 A1 | 2/2008 | Rackley, III et al. |
| 2008/0127317 A1 | 5/2008 | Nakhjiri |
| 2008/0208742 A1 | 8/2008 | Arthur et al. |
| 2008/0242274 A1 | 10/2008 | Swanburg et al. |
| 2008/0294556 A1 | 11/2008 | Anderson |
| 2008/0319887 A1 | 12/2008 | Pizzi et al. |
| 2009/0048971 A1 | 2/2009 | Hathaway et al. |
| 2009/0157531 A1 | 6/2009 | Bui |
| 2009/0177563 A1 | 7/2009 | Bernstein et al. |
| 2009/0228966 A1 | 9/2009 | Parfene et al. |
| 2009/0271287 A1 | 10/2009 | Halpern |
| 2009/0319427 A1 | 12/2009 | Gardner et al. |
| 2010/0114731 A1 | 5/2010 | Kingston et al. |
| 2010/0114733 A1 | 5/2010 | Collas et al. |
| 2010/0125495 A1 | 5/2010 | Smith et al. |
| 2010/0191602 A1 | 7/2010 | Mikkelsen et al. |
| 2010/0205077 A1 | 8/2010 | Hammad |
| 2011/0055080 A1 | 3/2011 | Ahlers et al. |
| 2011/0106674 A1 | 5/2011 | Perlman |
| 2011/0145149 A1 | 6/2011 | Valdes et al. |
| 2011/0153498 A1 | 6/2011 | Makhotin et al. |
| 2011/0191160 A1 | 8/2011 | Blackhurst et al. |
| 2011/0196782 A1 | 8/2011 | Allen et al. |
| 2011/0251892 A1 | 10/2011 | Laracey |
| 2011/0270748 A1 | 11/2011 | Graham et al. |
| 2011/0289004 A1 | 11/2011 | Prakash et al. |
| 2011/0295748 A1 | 12/2011 | Woodriffe |
| 2012/0011063 A1 | 1/2012 | Killian et al. |
| 2012/0018511 A1 | 1/2012 | Hammad |
| 2012/0022944 A1 | 1/2012 | Volpi |
| 2012/0078735 A1 | 3/2012 | Bauer et al. |
| 2012/0078751 A1 | 3/2012 | MacPhail et al. |
| 2012/0084210 A1 | 4/2012 | Farahmand |
| 2012/0110634 A1 | 5/2012 | Jakobsson |
| 2012/0130731 A1 | 5/2012 | Canetto |
| 2012/0143705 A1 | 6/2012 | Bhattacharya et al. |
| 2012/0150669 A1 | 6/2012 | Langley et al. |
| 2012/0150687 A1 | 6/2012 | Hart |
| 2012/0158589 A1 | 6/2012 | Katzin et al. |
| 2012/0185317 A1 | 7/2012 | Wong |

(56) References Cited

U.S. PATENT DOCUMENTS

| | | |
|---|---|---|
| 2012/0185387 A1 | 7/2012 | Doyle |
| 2012/0196586 A1 | 8/2012 | Grigg et al. |
| 2012/0197793 A1 | 8/2012 | Grigg et al. |
| 2012/0197794 A1 | 8/2012 | Grigg et al. |
| 2012/0209749 A1 | 8/2012 | Hammad et al. |
| 2012/0239417 A1 | 9/2012 | Pourfallah et al. |
| 2012/0253852 A1 | 10/2012 | Pourfallah et al. |
| 2012/0254021 A1* | 10/2012 | Wohied ............... G06Q 20/405 705/39 |
| 2012/0271705 A1 | 10/2012 | Postrel |
| 2012/0271712 A1 | 10/2012 | Katzin et al. |
| 2012/0284130 A1 | 11/2012 | Lewis et al. |
| 2012/0296720 A1 | 11/2012 | Pirillo |
| 2012/0303425 A1 | 11/2012 | Katzin et al. |
| 2012/0310774 A1 | 12/2012 | Chassin |
| 2012/0323762 A1 | 12/2012 | Kapur et al. |
| 2012/0330837 A1 | 12/2012 | Persaud et al. |
| 2013/0006848 A1 | 1/2013 | Kuttuva |
| 2013/0018777 A1 | 1/2013 | Klein |
| 2013/0018792 A1 | 1/2013 | Casey et al. |
| 2013/0030941 A1 | 1/2013 | Meredith et al. |
| 2013/0042261 A1 | 2/2013 | Tavormina et al. |
| 2013/0054454 A1 | 2/2013 | Purves et al. |
| 2013/0060679 A1 | 3/2013 | Oskolkov et al. |
| 2013/0060696 A1 | 3/2013 | Martin et al. |
| 2013/0060708 A1 | 3/2013 | Oskolkov et al. |
| 2013/0065555 A1 | 3/2013 | Baker et al. |
| 2013/0073365 A1 | 3/2013 | McCarthy |
| 2013/0073459 A1 | 3/2013 | Zacarias et al. |
| 2013/0080241 A1 | 3/2013 | Fisher |
| 2013/0110658 A1 | 5/2013 | Lyman et al. |
| 2013/0132854 A1 | 5/2013 | Raleigh et al. |
| 2013/0144663 A1 | 6/2013 | Qawami et al. |
| 2013/0144702 A1 | 6/2013 | Tabor et al. |
| 2013/0166332 A1 | 6/2013 | Hammad |
| 2013/0185167 A1 | 7/2013 | Mestre et al. |
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226751 A1 | 8/2013 | Friedholm et al. |
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246260 A1* | 9/2013 | Barten ............... G06Q 20/3674 705/41 |
| 2013/0246261 A1 | 9/2013 | Purves et al. |
| 2013/0246265 A1 | 9/2013 | Al-Sahli |
| 2013/0260734 A1 | 10/2013 | Jain et al. |
| 2013/0262309 A1 | 10/2013 | Gadotti |
| 2013/0262316 A1 | 10/2013 | Hruska |
| 2013/0290121 A1 | 10/2013 | Simakov et al. |
| 2013/0290169 A1 | 10/2013 | Bathula et al. |
| 2013/0304642 A1 | 11/2013 | Campos |
| 2013/0317928 A1 | 11/2013 | Laracey |
| 2014/0006129 A1 | 1/2014 | Heath |
| 2014/0006276 A1 | 1/2014 | Grigg et al. |
| 2014/0012750 A1 | 1/2014 | Kuhn et al. |
| 2014/0019352 A1 | 1/2014 | Shrivastava |
| 2014/0019360 A1 | 1/2014 | Yang |
| 2014/0038546 A1 | 2/2014 | Neal et al. |
| 2014/0058855 A1 | 2/2014 | Hussein et al. |
| 2014/0058936 A1* | 2/2014 | Ren ..................... G06Q 20/36 705/41 |
| 2014/0074581 A1 | 3/2014 | Johnson et al. |
| 2014/0074655 A1 | 3/2014 | Lim et al. |
| 2014/0074724 A1 | 3/2014 | Gordon et al. |
| 2014/0081783 A1 | 3/2014 | Paranjape et al. |
| 2014/0081854 A1 | 3/2014 | Sanchez et al. |
| 2014/0089171 A1 | 3/2014 | Gandhi |
| 2014/0096215 A1* | 4/2014 | Hessler ................ H04W 12/06 726/7 |
| 2014/0100975 A1 | 4/2014 | Van |
| 2014/0101048 A1 | 4/2014 | Gardiner et al. |
| 2014/0108254 A1 | 4/2014 | Lee |
| 2014/0108263 A1 | 4/2014 | Ortiz et al. |
| 2014/0114856 A1 | 4/2014 | Jung et al. |
| 2014/0122310 A1 | 5/2014 | Torrens et al. |
| 2014/0122563 A1* | 5/2014 | Singh ................ G06Q 20/3278 709/203 |
| 2014/0129357 A1 | 5/2014 | Goodwin |
| 2014/0129442 A1 | 5/2014 | Hanson et al. |
| 2014/0136352 A1 | 5/2014 | Ramakrishna et al. |
| 2014/0143089 A1 | 5/2014 | Campos et al. |
| 2014/0180849 A1 | 6/2014 | Kimberg et al. |
| 2014/0188718 A1 | 7/2014 | Grossman et al. |
| 2014/0188719 A1 | 7/2014 | Poornachandran et al. |
| 2014/0207680 A1 | 7/2014 | Rephlo |
| 2014/0214640 A1 | 7/2014 | Mallikarjunan et al. |
| 2014/0222670 A1 | 8/2014 | Concannon |
| 2014/0244506 A1 | 8/2014 | Gramling |
| 2014/0249948 A1 | 9/2014 | Graylin et al. |
| 2014/0250003 A1 | 9/2014 | Levchin et al. |
| 2014/0279097 A1 | 9/2014 | Alshobaki et al. |
| 2014/0279469 A1 | 9/2014 | Mendes |
| 2014/0279489 A1 | 9/2014 | Russell et al. |
| 2014/0279566 A1 | 9/2014 | Verma et al. |
| 2014/0282068 A1* | 9/2014 | Levkovitz ............... H04L 67/10 715/748 |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0310182 A1 | 10/2014 | Cummins |
| 2014/0337175 A1 | 11/2014 | Katzin et al. |
| 2014/0337621 A1 | 11/2014 | Nakhimov |
| 2014/0351072 A1 | 11/2014 | Wieler et al. |
| 2014/0351126 A1 | 11/2014 | Priebatsch |
| 2014/0351130 A1 | 11/2014 | Cheek et al. |
| 2014/0365363 A1 | 12/2014 | Knudsen et al. |
| 2014/0376576 A1 | 12/2014 | Jespersen et al. |
| 2014/0379576 A1 | 12/2014 | Marx et al. |
| 2015/0019944 A1 | 1/2015 | Kalgi |
| 2015/0026049 A1 | 1/2015 | Theurer et al. |
| 2015/0032627 A1 | 1/2015 | Dill et al. |
| 2015/0046241 A1 | 2/2015 | Salmon et al. |
| 2015/0046339 A1 | 2/2015 | Wong et al. |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0095219 A1 | 4/2015 | Hurley |
| 2015/0100442 A1 | 4/2015 | Van Heerden et al. |
| 2015/0112781 A1 | 4/2015 | Clark et al. |
| 2015/0140960 A1 | 5/2015 | Powell et al. |
| 2015/0154588 A1 | 6/2015 | Purves et al. |
| 2015/0178693 A1 | 6/2015 | Solis |
| 2015/0178725 A1 | 6/2015 | Poetsch |
| 2015/0186875 A1 | 7/2015 | Zhang et al. |
| 2015/0186886 A1 | 7/2015 | Schwalb et al. |
| 2015/0187021 A1 | 7/2015 | Moring et al. |
| 2015/0193869 A1 | 7/2015 | Del Vecchio et al. |
| 2015/0220914 A1 | 8/2015 | Purves et al. |
| 2015/0229622 A1 | 8/2015 | Grigg et al. |
| 2015/0254698 A1 | 9/2015 | Bondesen et al. |
| 2015/0254699 A1 | 9/2015 | Bondesen et al. |
| 2015/0287015 A1 | 10/2015 | Kaplinger et al. |
| 2015/0324768 A1 | 11/2015 | Filter et al. |
| 2015/0332252 A1 | 11/2015 | Shahrokhi et al. |
| 2015/0339662 A1 | 11/2015 | Huang et al. |
| 2015/0371326 A1 | 12/2015 | Montesano et al. |
| 2016/0004876 A1 | 1/2016 | Bye et al. |
| 2016/0012465 A1* | 1/2016 | Sharp ..................... G06Q 20/10 705/14.17 |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0048828 A1* | 2/2016 | Lee ..................... G06Q 20/3265 705/39 |
| 2016/0063496 A1 | 3/2016 | Royyuru et al. |
| 2016/0065370 A1 | 3/2016 | Le Saint et al. |
| 2016/0086170 A1 | 3/2016 | Hurt et al. |
| 2016/0086179 A1 | 3/2016 | Barbier |

(56) References Cited

U.S. PATENT DOCUMENTS

| | | |
|---|---|---|
| 2016/0092696 A1 | 3/2016 | Guglani et al. |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0140555 A1 | 5/2016 | Scipioni |
| 2016/0162889 A1 | 6/2016 | Badenhorst |
| 2016/0342962 A1 | 11/2016 | Brown et al. |
| 2016/0342992 A1 | 11/2016 | Lee |
| 2016/0379215 A1 | 12/2016 | Clerkin |
| 2017/0017958 A1 | 1/2017 | Scott et al. |
| 2017/0061402 A1 | 3/2017 | Mobin et al. |
| 2017/0061406 A1 | 3/2017 | Adams et al. |
| 2017/0164139 A1 | 6/2017 | Deselaers et al. |
| 2017/0193468 A1 | 7/2017 | Chougule et al. |
| 2017/0228715 A1 | 8/2017 | Gurunathan |
| 2018/0007052 A1 | 1/2018 | Quentin |
| 2018/0068308 A1 | 3/2018 | Gupta et al. |
| 2018/0082283 A1 | 3/2018 | Sharma |
| 2018/0157336 A1 | 6/2018 | Harris et al. |
| 2018/0322488 A1 | 11/2018 | Arana et al. |
| 2018/0365675 A1 | 12/2018 | Sivaraman |
| 2018/0374076 A1 | 12/2018 | Wheeler |
| 2019/0304029 A1 | 10/2019 | Murray et al. |
| 2021/0166260 A1 | 6/2021 | Ho et al. |

FOREIGN PATENT DOCUMENTS

| | | | |
|---|---|---|---|
| WO | WO-2013/079793 A1 | 6/2013 | |
| WO | WO-2014/012138 A1 | 1/2014 | |
| WO | WO-2014/111888 A1 | 7/2014 | |
| WO | WO-2014/207615 A1 | 12/2014 | |
| WO | WO-2015/016780 A1 | 2/2015 | |
| WO | WO2015/023172 A2 | 2/2015 | |
| WO | WO-2016/009198 A1 | 1/2016 | |
| WO | WO-2016/053975 A1 | 4/2016 | |
| WO | WO-2016/097879 A1 | 6/2016 | |
| WO | WO-2016/172107 A1 | 10/2016 | |
| WO | WO-2016/196054 A1 | 12/2016 | |

OTHER PUBLICATIONS

How to Control Children's Spending on Debit Cards | Money | by Jill Paperworth, May 10, 2009, https:www.theguardian.com/money/2009/mar/.../children-debit-cards-online-spend . . . (Year: 2009).

Smart Card Alliance, "The Mobile Payments and NFC Landscape: A U.S. Perspective," Sep. 2011. 53 pages.

"Cashcloud Mobile eWallet", FinTech Forum Exchange, Jul. 1, 2016. 4 pages.

"Cashcloud mobile eWallet", Popote Payments, www.popotepayments.com, 2016. 6 pages.

Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.

White, Ron, "How Computers Work", Que Publishing, 7th Ed, Oct. 15, 2003, p. 4. 23 pages.

EMV, "Payment Tokenisation Specification Technical Framework", 2014 EMVCO, LLC. 84 pages.

Kyrillidis, Mayes, Markantonakis; Card-present Transactions on the Internet Using the Smart CardWeb Server; 2013, IEEE; 12th (Year: 2013).

The University of Alaska staff, Managing Finance Reports with Vista Plus, Aug. 2008, The University of Alaska, web, 2-20 (Year: 2008).

* cited by examiner

US 11,295,297 B1

SYSTEMS AND METHODS FOR PUSHING USABLE OBJECTS AND THIRD-PARTY PROVISIONING TO A MOBILE WALLET

TECHNICAL FIELD

Embodiments of the present disclosure relate generally to the field of mobile wallets.

BACKGROUND

Payments for products and services are often completed using credit cards, debit cards, checks, and/or cash. At the same time, most people carry some type of mobile device. Electronic-based transactions may be carried out using a mobile device. For example, mobile device users may purchase goods and services through payment applications at point-of-sale terminals. Beneficially, using a mobile device to make payments at point-of-sale terminals may alleviate or reduce the need to carry cash or payment cards (e.g., credit cards), which some users may find appealing.

SUMMARY OF THE INVENTION

One embodiment relates to a computer-implemented method. The computer-implemented method includes receiving, by a mobile wallet computing system, information relating to a usable object from a party and provisioning, by the mobile wallet computing system, the usable object to a mobile wallet associated with a user. The computer-implemented method further includes receiving, by the mobile wallet computing system, one or more rules relating to the usable object from the party, wherein the one or more rules define an activation condition for the usable object such that when the activation condition is fulfilled the usable object is active in the mobile wallet of the user; determining, by the mobile wallet computing system, whether the activation condition is fulfilled; and in response to the activation condition for the usable object being fulfilled, activating, by the mobile wallet computing system, the usable object in the mobile wallet of the user.

Another embodiment relates to a mobile wallet computing system. The mobile wallet computing system includes a network interface structured to communicate data over a network, a processor, and a memory. The memory is coupled to the processor and includes non-transitory machine readable storage media having instructions stored thereon. When executed by the processor, the instructions cause the mobile wallet computing system to receive information relating to a usable object from a party and provision the usable object to a mobile wallet associated with a user. The instructions further cause the mobile wallet computing system to receive one or more rules relating to the usable object from the party, wherein the one or more rules define an activation condition for the usable object such that when the activation condition is fulfilled the usable object is active in the mobile wallet of the user, determine whether the activation condition for the usable object is fulfilled, and in response to the activation condition for the usable object being fulfilled, activate the usable object in the mobile wallet of the user.

Another embodiment relates to a mobile device associated with a user. The mobile device includes a display, a processor, and a memory. The memory includes non-transitory machine readable storage media having a mobile wallet application associated with a mobile wallet held by the user stored thereon. The memory is coupled to the processor, and the mobile wallet application includes instructions executable by the processor that are structured to cause the processor to receive a usable object for the mobile wallet of the user from a party, monitor a context of the mobile device with respect to one or more rules configured by the party, wherein the one or more rules define an activation condition for the usable object such that when the activation condition is fulfilled the usable object is active in the mobile wallet of the user, and in response to the activation condition for the usable object being fulfilled based on the context, activate the usable object in the mobile wallet of the user.

DETAILED DESCRIPTION

Figure 1:
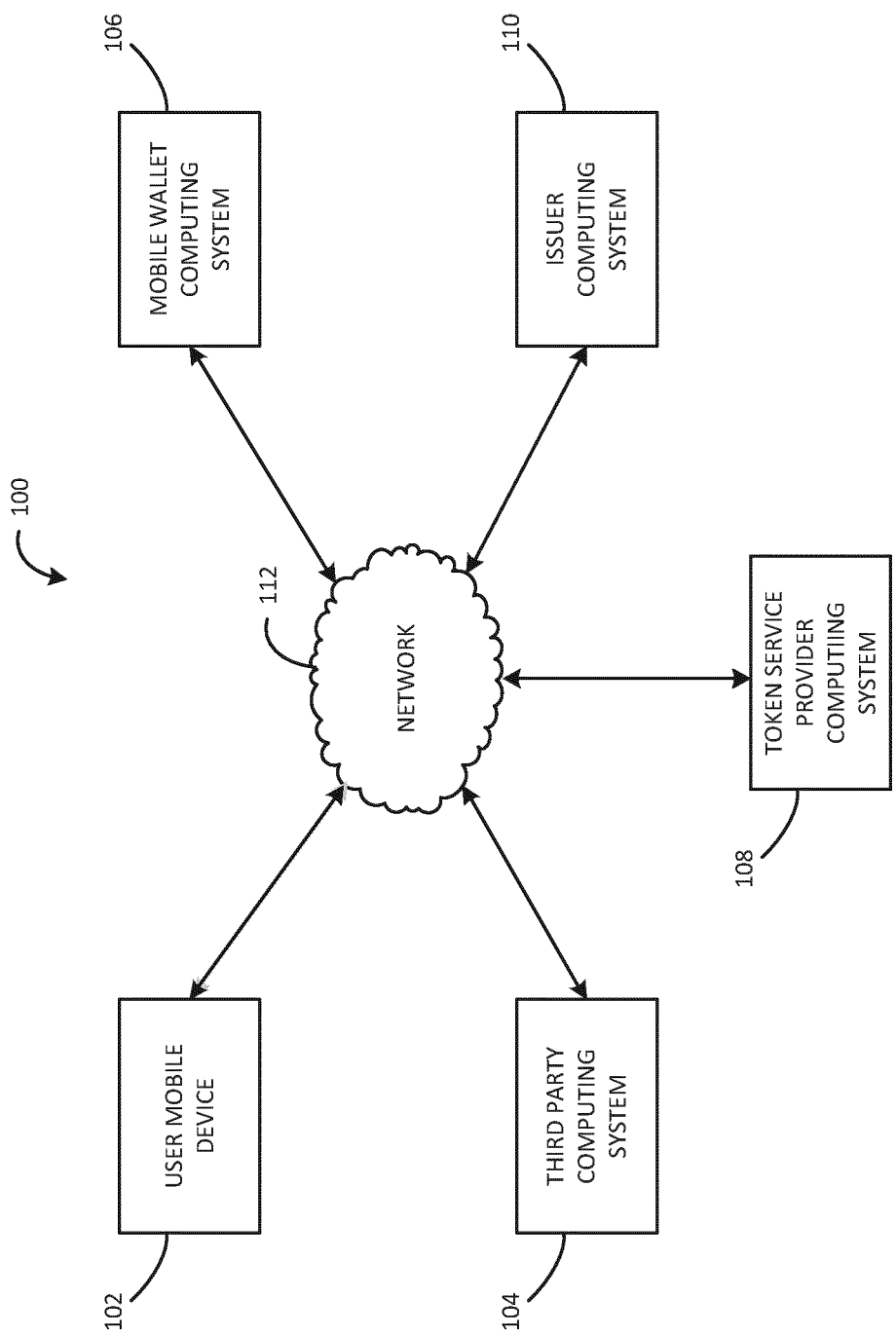
FIG. 1 is a system for third-party provisioning of a usable object to a mobile wallet, according to an example embodiment.

Referring to the Figures generally, various systems, methods, and apparatuses for third-party provisioning of a usable object to a mobile wallet and for pushing usable value objects from one mobile wallet to another mobile wallet are described herein. In various embodiments, a mobile device of a user includes a mobile wallet. As described in more detail below, a "mobile wallet" is a digital wallet provided on a user's mobile device that includes payment capabilities. In this regard, the mobile wallet may facilitate, enable, or otherwise transmit/provide a code, such as a barcode or a quick-response ("QR") code, via a communication protocol (e.g., near-field communication ("NFC")) to a point-of-sale terminal to transfer payment information and enable the purchase of a good or service. As such, the digital wallet may store usable value objects that can be used to make payments, such as a tokenized payment card (e.g., a credit card, a debit card), a non-tokenized payment card (e.g., a prepaid card such as a gift card), redeemable loyalty points, and so on. The digital wallet may further store non-payment usable objects that the user may wish to display or store using the user's mobile device, such as a ticket, a boarding pass, a coupon, an identification card, health care cards, insurance cards, library cards, transportation cards, and so on. The digital wallet may include many other capabilities, functions, and features that are described below in more detail.

In the embodiments described herein, while the user may cause provisioning of various usable objects to the user's mobile wallet, objects may also be provisioned to the user's mobile wallet by different "provisioning parties," such as via third parties (e.g., individuals or organizations that do not have a mobile wallet account) or pushed to the user's mobile wallet by other mobile wallet users. Furthermore, the provisioning parties may be able to manually activate/deactivate the user's access to the pushed usable value object and/or set rules that automatically activate/deactivate the user's access to the pushed usable value object.

An example implementation may be described as follows. A user registers and activates a mobile wallet account with a mobile wallet computing system. A third party then causes a provisioning of a usable value object to the user's mobile wallet. Alternatively, a second user with a mobile wallet account causes a provisioning of a usable value object to the second user's mobile wallet. The second user then pushes the usable object to the first user's mobile wallet. Once the usable object is provisioned in the user's mobile wallet, the provisioning party (e.g., the third party or the second user) can manually activate or deactivate the usable object in the user's mobile wallet. Additionally, or alternatively, the provisioning party can set rules (e.g., rules that are dependent on the fulfillment of a condition or the occurrence of an event, such as the user being within a certain geographic area or that a certain amount of time has lapsed) that cause the usable object to be automatically activated or deactivated in the user's mobile wallet once the rules are fulfilled.

The systems and methods described herein for third-party provisioning and pushing of usable objects offer a number of technical advantages over current systems and methods for mobile wallets. Currently, mobile wallets predominantly require the user to register and provision all the usable objects that the user wishes to have access to in the user's mobile wallet. By contrast, the systems and methods described herein allow a third party without a mobile wallet to provision usable objects to a user's mobile wallet. Additionally, the systems and methods described herein allow other mobile wallet users to push usable objects provisioned in their own mobile wallets to the mobile wallets of other users. One technical advantage of the present systems and methods is that third parties and other users can use the present systems and methods to share usable objects with a mobile wallet user without the mobile wallet user having to personally register the usable object to the user's mobile wallet.

Furthermore, currently mobile wallets do not allow third parties or other users control over how another user uses objects provisioned to the user's mobile wallet. However, the present systems and methods allow third parties and other users to manually activate and deactivate usable objects that they have provisioned to a given user's mobile wallet. Alternatively, the present systems and methods allow third parties and other users to configure one or more rules for usable objects the third parties or other users have provisioned to a user's mobile wallet. When a condition or event associated with the rule or rules is fulfilled, the usable object is automatically activated or deactivated in the mobile wallet. Thus, another feature of the systems and methods described herein is that third parties and other users can provision or push usable objects to a user's mobile wallet and further exercise some level of control over how the usable objects are used. This feature provides the technical advantage of automating the process of applying third-party preferences for usable objects that have been provisioned to the user's mobile wallet. For example, without this feature, a mobile wallet user must manually remove, or remember not to use, a usable object from his or her mobile wallet for which the responsible third party has expressed a desire that the mobile wallet user no longer use or not use in certain circumstances. In turn, the user may be able to conduct mobile wallet transactions more quickly and more easily.

Referring now to FIG. 1, a system 100 for third-party provisioning of a usable object to a mobile wallet is shown, according to an example embodiment. In the system 100, the provisioning party is a third party that does not have a mobile wallet but may provision a usable object to a mobile wallet user using the system 100. The system 100 includes a user mobile device 102, a third party computing system 104, a mobile wallet computing system 106, a token service provider computing system 108, and an issuer computing system 110 connected by a secure network (e.g., network 112). In operation, a user may activate or register, via the user mobile device 102, a mobile wallet account with the mobile wallet computing system 106. Once the user has a mobile wallet account, the third party associated with the third party computing system 104 may register and provision a usable object to the user's mobile wallet on the user mobile device 102.

As used herein, a "usable object" or "usable value object" is any item that may be provisioned to a user's mobile wallet and later utilized by the user via the mobile wallet. Usable objects may include objects that can be used to make payments, such as payment cards. Payment usable objects may include tokenized objects (e.g., tokens for debit cards, credit cards, prepaid cards, gift cards, etc.) as well as objects that cannot or need not be tokenized (e.g., prepaid cards, gift cards, loyalty or rewards points, etc.). Usable value objects may also include non-payment objects, such as scans or other digital representations of various physical objects or e-items. For example, non-payment usable objects may include loyalty cards, identification cards (e.g., a driver's license, an employee identification card, a passport, etc.), membership cards, wholesale club cards, tickets, reservations, boarding passes, coupons, health care cards, insurance cards (e.g., automobile, health insurance, dental insurance, etc.), library cards, transportation cards (e.g., bus passes, transit fare passes, etc.), and so on.

In some arrangements, provisioning a usable object for in this arrangement making payments occurs by the third party submitting information about the usable object to the mobile wallet computing system 106, the mobile wallet computing system 106 tokenizing the object using the token service provider computing system 108, and either the mobile wallet computing system 106 or the token service provider computing system 108 provisioning the token to the user's mobile wallet on the user mobile device 102. In other arrangements, the usable object is not tokenized and instead directly provisioned to the user's mobile wallet on the user mobile device 102 once the third party submits information about the usable object to the mobile wallet computing system 106. Once the usable object is provisioned, the third party, via the third party computing system 104 communicating with the mobile wallet computing system 106, may further remotely activate and deactivate the usable object provisioned to the user's mobile wallet. Alternatively or additionally, the third party may configure rules for the usable object that cause the usable object to be automatically activated or deactivated within the mobile wallet on the user mobile device 102.

The user mobile device 102 includes any type of mobile device operated by a user in connection with services provided by a mobile wallet provider. As such, the user mobile device 102 includes, but is not limited to, a phone (e.g., a smartphone), a computing device (e.g., a tablet computer, a laptop computer, a personal digital assistant, etc.), a wearable device (e.g., a smart watch, smart glasses, a smart bracelet, etc.), and so on. As described in further detail below, the user mobile device 102 includes a mobile wallet associated with the user (e.g., implemented through a mobile wallet application 206). In the example shown, the user mobile device 102 is a smartphone.

Figure 2:
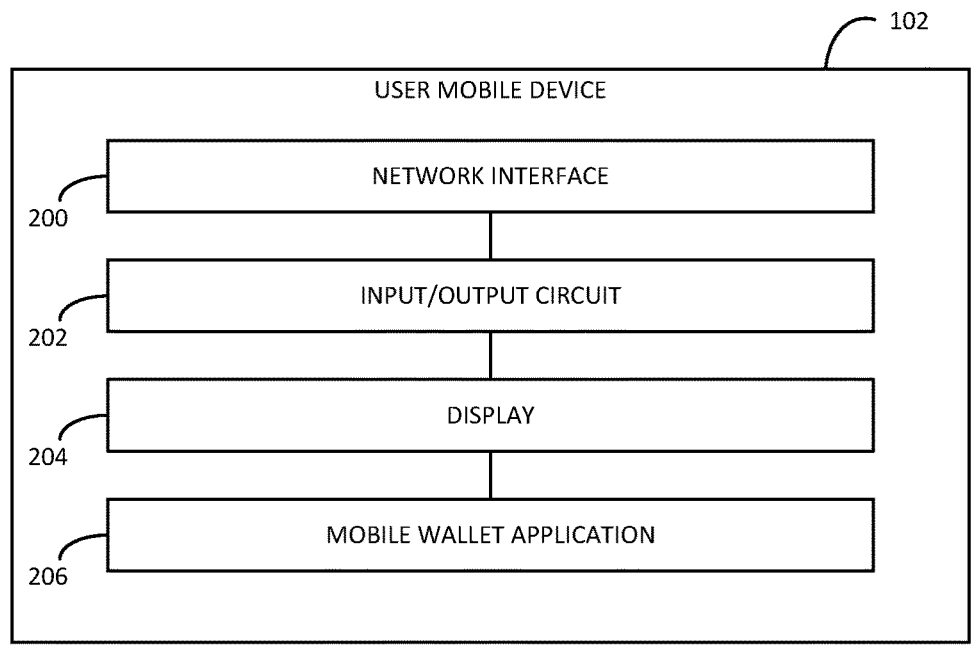
FIG. 2 is a detailed schematic diagram of the user mobile device of FIG. 1, according to an example embodiment.

Referring now to FIG. 2, a detailed schematic diagram of the user mobile device 102 is shown, according to an example embodiment. As shown in FIG. 2, the user mobile device 102 includes a network interface 200, an input/output circuit 202, a display 204, and a mobile wallet application 206. The network interface 200 includes program logic that facilitates connection of the user mobile device 102 to the network 112. Accordingly, the network interface 200 supports communication between the user mobile device 102 and other components of the system 100.

The input/output circuit 202 is structured to receive communications from and provide communications to a user of the user mobile device 102. In this regard, the input/output circuit 202 is structured to exchange data, communications, instructions, etc. with an input/output component of the user mobile device 102. Accordingly, in one embodiment, the input/output circuit 202 may include an input/output device, such as a touchscreen, a keyboard, a microphone, or a speaker. In another embodiment, the input/output circuit 202 may include communication circuitry for facilitating the exchange of data, values, messages, and the like between an input/output device and the components of the user mobile device 102. In yet another embodiment, the input/output circuit 202 may include machine-readable media for facilitating the exchange of information between the input/output device and the components of the user mobile device 102. In still another embodiment, the input/output circuit 202 may include any combination of hardware components (e.g., a touchscreen), communication circuitry, and machine-readable media.

The display 204 may be a screen, a touchscreen, and the like. The user mobile device 102 may use the display 204 to communicate information to the user (e.g., by displaying the information to the user on the display 204) and/or to receive communications from the user (e.g., through a keyboard provided on a touchscreen of the display 204). In some embodiments, the display 204 may be a component of an input/output device, as described above.

In various embodiments, the user mobile device 102 includes a memory comprising non-transitory machine readable storage media having the mobile wallet application 206 stored fully or partly thereon. The memory is coupled to a processor, and the mobile wallet application 206 includes instructions that are executable by the processor. In this way, the mobile wallet application 206 is configured to interface with the mobile wallet computing system 106 to allow a user to manage the user's mobile wallet. For example, the mobile wallet application 206 may interface with the mobile wallet computing system 106 to facilitate the user in registering usable objects to the user's mobile wallet and in performing mobile wallet transactions with the usable objects (e.g., making a payment, displaying the usable object on the display 204, etc.). The mobile wallet application 206 is further configured to interface with the third party computing system 104 and/or the mobile wallet computing system 106 to receive usable objects from the third party computing system 104, as described in further detail below. Accordingly, in various arrangements, the mobile wallet application 206 is communicably coupled via the network interface 200 to the third party computing system 104, the mobile wallet computing system 106, and the token service provider computing system 108.

In some embodiments, the mobile wallet application 206 includes a circuit embodied within the user mobile device 102. For example, the mobile wallet application 206 may include program logic stored in a system memory of the user mobile device 102. In such arrangements, the program logic may configure a processor of the user mobile device 102 to perform at least some of the functions discussed below with respect to a mobile wallet system 404 of the mobile wallet computing system 106. In some embodiments, the mobile wallet application 206 is a web-based application, and many of the functionalities are provided by the mobile wallet system 404 of the mobile wallet computing system 106. Accordingly, as will be understood, the level of functionality that resides on the user mobile device 102 versus the mobile wallet computing system 106 will vary depending on the implementation.

It should also be understood that the role the mobile wallet application 206 takes in payment transactions will depend on the implementation of the mobile wallet. For example, in some arrangements, the mobile wallet may be configured in a secure element framework. In a secure element framework, the user mobile device 102 includes a secure element that is separate from the main system memory of the user mobile device 102 (e.g., any element having smart card functionalities, such as a universal subscriber identify circuit (a "SIM" card) or a secure digital card). Mobile wallet data, including tokens representing usable objects provisioned to the user's mobile wallet, for the user is stored in the secure element on the user mobile device 102. As another example, in other arrangements, the mobile wallet may be configured under a host card emulation ("HCE") framework. In an HCE framework, mobile wallet data is maintained within a cloud-based environment. The cloud-based environment may enable provisioning of usable objects to the mobile wallet application 206 on the user mobile device 102. In this regard, the payment tokens are stored in the user mobile device 102 for a limited time (or a limited number of events) until they expire, and then new payment tokens are provisioned to the user mobile device 102. In yet other arrangements, the mobile wallet is implemented as a hybrid between a secure element framework and an HCE. All such variations are intended to fall within the scope of the present disclosure.

In various arrangements, the mobile wallet application 206 is structured to enable the user to manage the user's mobile wallet. In this regard, the mobile wallet application 206 is structured to present, control, and otherwise manage displays or graphic user interfaces on the user mobile device 102, for example, including information related to various usable objects provisioned to the user's mobile wallet. For example, the mobile wallet application 206 may present the user with displays enabling the user to input information relating to a usable object, such as a payment card, owned by the user (e.g., by entering a primary account number ("PAN") for the payment card or by taking a picture of the payment card using a camera and the input/output circuit 202 of the user mobile device 102). The mobile wallet application 206 then processes the information input by the user and transmits the information to the mobile wallet computing system 106 for storage (e.g., in the mobile wallet database 410 in association with the user). As another example, the mobile wallet application 206 may interface with an application running on the user mobile device 102 (e.g., a text messaging application, an email application, a ticket application, a hotel application, etc.) and extract information about a usable object, such as a ticket, a pass, a reservation, or a coupon, from the application. The mobile wallet application 206 then transmits the information to the mobile wallet application 206 for storage. As a third example, the mobile wallet application 206 may monitor one or more online accounts associated with the user that the user has given the mobile wallet application 206 permission to access, such as an email account, ticketing account, or e-commerce account whereby the user may purchase vouchers (e.g., Groupon®, LivingSocial®). The mobile wallet application 206 extracts information relating to a usable object (e.g., a movie ticket, a concert ticket, a theatre ticket, a boarding pass, a train ticket, a voucher, a coupon, etc.) and transmits the extracted information to the mobile wallet computing system 106.

In some arrangements, after transmitting information about the usable payment object to the mobile wallet computing system 106, the mobile wallet application 206 then facilitates tokenization of the usable payment object. In this regard, the mobile wallet application 206 may receive a token associated with the usable object (e.g., a token representing a payment card) from the mobile wallet computing system 106 or the token service provider computing system 108. The mobile wallet application 206 may subsequently carry out mobile wallet transactions using the token. For non-tokenized usable value objects, the mobile wallet application 206 may receive a non-token representation of the usable object (e.g., a scan of the object, a digital representation of the object, etc.) from the mobile wallet computing system 106 or directly from the user, e.g., via the camera taking a picture of the object. For example, the mobile wallet application 206 may receive a scan of a driver's license. In still other arrangements, the mobile wallet application 206 may receive a token for a non-payment usable object that the user can use to temporarily download the usable object to the user's mobile wallet or to another computing device (e.g., the user mobile device 102 may receive a token representing the user's passport, and the user can submit the token to the mobile wallet computing system 106 and temporarily receive a scan of the user's passport on the user mobile device 102).

Alternatively, in other embodiments, the mobile wallet application 206 does not receive the usable object from the mobile wallet computing system 106. Instead, the mobile wallet application 206 gathers the information and generates a usable object for the user's mobile wallet independently. For example, the mobile wallet application 206 may extract information about a ticket that the user has purchased from an email application on the user mobile device 102. The mobile wallet application 206 then creates a digital ticket in the user's mobile wallet. The mobile wallet application 206 may simultaneously or subsequently transmit information about the usable object to the mobile wallet computing system 106 for storage.

Furthermore, in addition to receiving usable objects provisioned by the mobile wallet user, the mobile wallet application 206 may receive a usable object from a provisioning party, such as the third party. In some arrangements, the mobile wallet application 206 receives the usable object via the mobile wallet computing system 106 in the same manner the mobile wallet application 206 receives a usable object registered by the user to the user's mobile wallet (e.g., the mobile wallet computing system 106 provisions a token of the usable object registered by the third party to the mobile wallet application 206). In other arrangements, the mobile wallet application 206 at least partially receives the usable object via a device associated with the third party computing system 104. For example, the user mobile device 102 may include an NFC system including a chip and an associated controller that configures the chip to exchange information via NFC (e.g., an NFC reader). The mobile wallet application 206 may establish an NFC communication session with the third party device and receive the usable object from the third party computing system 104 via the third party device and the NFC communication session. As another example, the mobile wallet application 206 may perform an NFC tap with the device associated with the third party device to verify the user's location, after which the mobile wallet computing system 106 provisions the usable object to the user mobile device 102.

The mobile wallet application 206 may additionally present the user with displays enabling the user to engage in mobile wallet transactions using the usable objects provisioned to the user's mobile wallet. As used herein, the term "mobile wallet transaction" is meant to be broadly interpreted to refer to transactions accomplished via the mobile wallet on the user mobile device 102. As such, a mobile wallet transaction may include, but is not limited to, a person-to-person payment, a payment for a good or service at a point-of-sale terminal of a merchant, and the like. A mobile wallet transaction may also include a non-payment transaction, such as transmitting ticket information to a ticketing device or displaying a non-payment usable object on the display 204 of the user mobile device 102. In some arrangements, the mobile wallet application 206 engages in mobile wallet transactions through the initiation of communications with, for example, a merchant point-of-sale device. In this regard, the user mobile device 102 may include an NFC device configured to exchange information with a merchant point-of-sale device. The mobile wallet application 206 may thus transmit payment information to the merchant point-of-sale device using the NFC chip and associated controller. In other arrangements, the mobile wallet application 206 engages in mobile wallet transactions through the display 204. For example, the user mobile device 102 may display a QR code such that a third party can scan the QR code during a mobile wallet transaction.

The mobile wallet application 206 is also configured to present displays that enable the user to perform actions with usable objects. For example, the mobile wallet application 206 may present the user with displays enabling the user to make a payment with a usable object. As another example, the mobile wallet application 206 may present the user with displays enabling the user to show a usable object to an individual, a scanner, and so on. The mobile wallet application 206 may further present displays to the user directed to helping the user manage access to the usable objects in the user's mobile wallet. As an example, the mobile wallet application 206 may present the user with displays illustrating whether a usable object provisioned to the user's mobile wallet by a third party is active or not and, if the usable object has been deactivated, allow the user to send a message to the third party requesting that the usable object be reactivated.

Additionally, in some arrangements, the mobile wallet application 206 may be configured to present displays enabling the user to send messages to the third party computing system 104 or otherwise exchange information with the third party computing system 104. For example, the mobile wallet application 206 may allow the user to create a "thank you" message to the third party in response to receiving a usable object from the third party computing system 104. As another example, in response to a mobile wallet transaction being denied because the usable object has been deactivated (e.g., because the transaction violates rules for the usable object, as discussed in further detail below), the mobile wallet application 206 may allow the user to create a message asking the third party for one-time approval of the transaction or asking the third party to modify rules for the usable object such that the transaction may be allowed. As a third example, the mobile wallet application 206 may allow the user to create a message asking the third party to provision a specific usable object to the user's mobile wallet. The mobile wallet application 206 then transmits the message to the third party computing system 104 directly or indirectly via the mobile wallet computing system 106.

The third party computing system 104 is associated with a "third party," which as used herein refers to a party that does not have a mobile wallet with the mobile wallet computing system 106 but is interested in provisioning usable objects to a mobile wallet user. For example, the third party may be an individual who does not have a mobile wallet or who has a mobile wallet with a mobile wallet provider different from the provider associated with the mobile wallet computing system 106. As another example, the third party may be a merchant (e.g., a retailer, wholesaler, marketplace operator, service provider, etc.).

Figure 3:
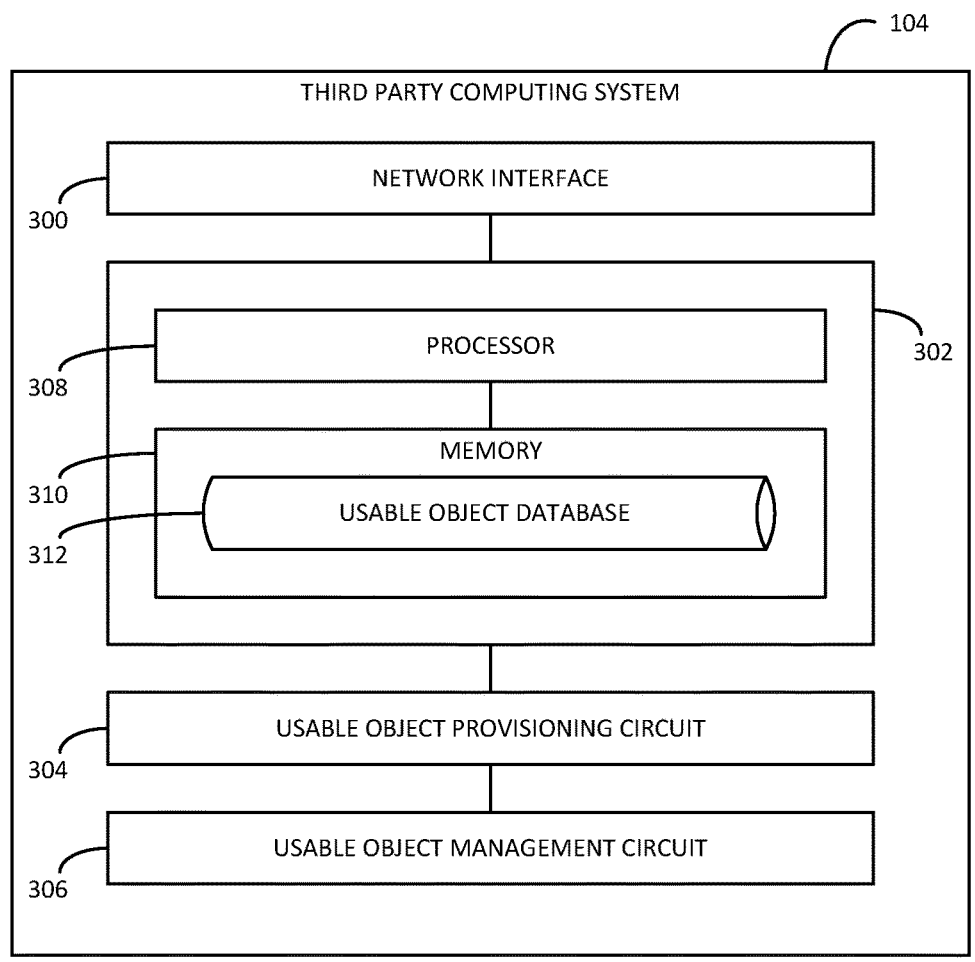
FIG. 3 is a detailed schematic diagram of the third party computing system of FIG. 1, according to an example embodiment.

Referring now to FIG. 3, a detailed schematic diagram of the third party computing system 104 is shown, according to an example embodiment. As shown in FIG. 3, the third party computing system 104 includes a network interface 300, a processing circuit 302, a usable object provisioning circuit 304, and a usable object management circuit 306. The network interface 300 includes program logic that facilitates connection of the third party computing system 104 to the network 112. Accordingly, the network interface 300 supports communication between the third party computing system 104 and other components of the system 100.

The processing circuit includes a processor 308 and a memory 310. As shown in FIG. 3, the memory 310 includes a usable object database 312. The usable object database 312 is structured to retrievably store information relating to usable objects registered by the third party computing system 104 to the mobile wallet computing system 106 and subsequently provisioned to the mobile wallet on the user mobile device 102. For example, if the third party is a merchant, the usable object database may store information relating to coupons, loyalty cards, rewards points, gift cards, payment cards, and so on associated with the merchant. The usable object database 312 may include usable objects that the merchant has provisioned to user mobile wallets, as well as usable objects that the merchant wishes to provision to user mobile wallets. In various embodiments, the usable object database 312 is structured as one or more remote data-storage facilities (e.g., cloud servers).

The usable object provisioning circuit 304 is configured to generate information relating to usable objects and provision or facilitating provisioning of the usable objects to user mobile wallets, such as the mobile wallet on the user mobile device 102. In some arrangements, the usable object provisioning circuit 304 provisions a usable object to the user mobile device 102 via the mobile wallet computing system 106. For example, if the third party is a merchant, an individual may purchase a gift card associated with the third party for the user. In response, the usable object provisioning circuit 304 may gather information about the user from the individual and generate information relating to the purchased gift card (e.g., generate a gift card number to be used in transactions). The usable object provisioning circuit 304 may then transmit the information to the mobile wallet computing system 106, which provisions the gift card to the mobile wallet on the user mobile device 102 (e.g., by downloading the gift card number or a token of the gift card number to the user mobile device 102). The usable object provisioning circuit 304 may also store the information in the usable object database 312.

In other arrangements, the usable object provisioning circuit 304 directly provisions the usable object to the mobile wallet. As an example, if the third party is a merchant, the usable object provisioning circuit 304 may generate a coupon (e.g., a generic coupon, a coupon tailored for the user) and store the coupon in the usable object database 312. The usable object provisioning circuit 304 may then provide the usable object to the mobile wallet on the user mobile device 102 when the user mobile device 102 is at a merchant brick-and-mortar location. For instance, the third party computing system 104 may include a point-of-sale terminal with a radio-frequency identification ("RFID") device or an NFC device in the brick-and-mortar location. When the user makes a purchase using the user's mobile wallet on the user mobile device 102 at the point-of-sale terminal, the usable object provisioning circuit 304 provisions the coupon to the mobile wallet on the user mobile device 102 via the point-of-sale terminal. Alternatively, the brick-and-mortar location of the merchant may have a Wi-Fi hotspot. Accordingly, the usable object provisioning circuit 304 may provision the coupon to the user mobile device 102 when the user mobile device 102 connects to the Wi-Fi hotspot. As another option, the usable object provisioning circuit 304 may include a handheld electronic device (e.g., a tablet run by an employee of the third party) with Bluetooth functionalities. As such, the usable object provisioning circuit 304 may provision the coupon to the user mobile device 102 through a Bluetooth session between the handheld electronic device and the user mobile device 102. Once the usable object provisioning circuit 304 provisions the usable object to the user mobile device 102, the usable object provisioning circuit 304 may also transmit a notification to the mobile wallet computing system 106 indicating that the usable object has been provisioned to the user mobile device 102.

In yet other arrangements, the usable object provisioning circuit 304 provisions the usable object through a combination of the mobile wallet computing system 106 and the third party computing system 104. For example, the mobile wallet computing system 106 may require the third party computing system 104 to take one or more actions to authenticate the user before provisioning the usable object. An example of an authentication process may be an NFC tap between the user mobile device 102 and a computing device (e.g., a point-of-sale device, a tablet, etc.) associated with the third party computing system 104, which indicates that the parties are proximate to each other at the time of the provisioning. Once the usable object provisioning circuit 304 submits proof of the authentication to the mobile wallet computing system 106, the mobile wallet computing system 106 provisions the usable object to the user mobile device 102.

The usable object management circuit 306 is configured to manage the user's access to a usable object provisioned to the user mobile device 102 by the usable object provisioning circuit 304. In some arrangements, the usable object management circuit 306 communicates with the mobile wallet computing system 106 (e.g., via the network interface 300) to activate and deactivate the usable object in the user's mobile wallet. For example, the usable object management circuit 306 may detect that the user is within a geographic distance of a brick-and-mortar location associated with the third party (e.g., based on the usable object management circuit 306 interfacing with the user mobile device 102 and using a global positioning system ("GPS") functionality of the user mobile device 102 to determine the location of the user mobile device 102, based on the user mobile device 102 connecting to a Wi-Fi hotspot at the brick-and-mortar location, etc.). In response, the usable object management circuit 306 notifies the mobile wallet computing system 106 to activate a usable object provisioned to the user's mobile wallet. Subsequently, when the usable object management circuit 306 detects that the user is outside of the geographic distance from the brick-and-mortar location, the usable object management circuit 306 notifies the mobile wallet computing system 106 to deactivate the usable object.

In other arrangements, alternatively or additionally, the usable object management circuit 306 sets up one or more rules with the mobile wallet computing system 106. As described in further detail below, the mobile wallet computing system 106 automatically activates or deactivates the usable object within the user's mobile wallet based on whether activation or deactivation conditions defined by rule(s) are fulfilled. Activation or deactivation conditions may include a geofence (e.g., defined by certain latitude/longitude coordinates, defined as a radius around certain coordinates, etc.), a purchase amount limit, a time limitation (e.g., the usable object is only active for a certain number of hours or days, the usable object is only active between certain hours of a day, the usable object is only active for certain dates, etc.), a merchant limitation (e.g., as classified by the Merchant Category Code ("MCC") or the North American Industry Classification System ("NAICS")), a zip code, a product code (e.g., as classified by a Universal Product Code ("UPC") of the item being purchased), the hardware the mobile wallet is running on, and so on. Additionally, a usable object may be activated or deactivated in response to an activation or deactivation condition of a rule being fulfilled. As an example, the usable object management circuit 306 may configure rules for a usable object such that the usable object is deactivated once a certain number of days have passed or if the user mobile device 102 leaves certain zip codes. As another example, the usable object management circuit 306 may configure rules such that a usable payment object is only activated only when the user is making a purchase with the usable object at merchants classified under certain MCCs. Furthermore, a usable object may only be activated or deactivated in response to two or more conditions defined by the rules being fulfilled. For example, the usable object management circuit 306 may configure rules for a usable payment object including a geofence and a purchase limit such that the usable object remains active if the user leaves the geofence or goes over the purchase limit but is deactivated if both occur.

It should be understood that, in other embodiments, the third party computing system 104 may be configured differently from the embodiment of the third party computing system 104 shown in FIG. 3. For example, in some arrangements, the third party computing system 104 may be configured as a mobile device (e.g., similar to the user mobile device 102). The third party may use the mobile device to gather and generate information about a usable object similarly to how the user would use the user mobile device 102 to register usable objects to the user's mobile wallet (e.g., by taking a picture of the usable object, by entering a PAN or other number associated with the usable object by a keyboard provided on the mobile device, by extracting information from an application on the mobile device, etc.). The usable object provisioning circuit 304 may then transmit the information to the mobile wallet computing system 106, which provisions the usable object to the user's mobile wallet.

The mobile wallet computing system 106 is structured to permit, enable, facilitate, manage, process, and otherwise allow mobile wallet transactions. In this regard, the mobile wallet computing system 106 may store information relating to various usable objects. The mobile wallet computing system 106 is associated with, owned by, and/or otherwise operated by a mobile wallet provider. In some embodiments, the mobile wallet provider is a financial institution, such as the issuer associated with the issuer computing system 110. In other embodiments and as shown in FIG. 1, the mobile wallet provider may be a third-party provider relative to financial institutions.

Figure 4:
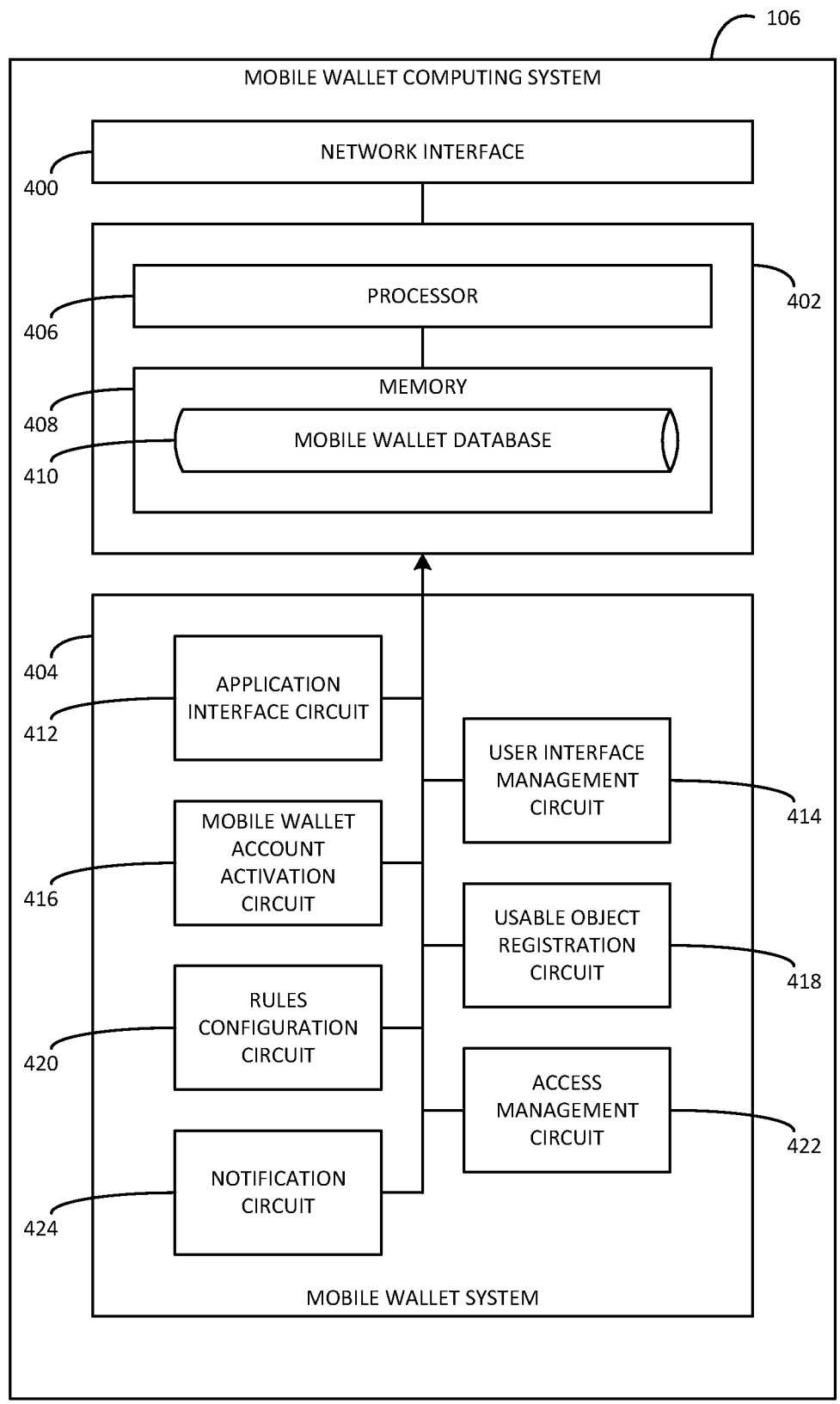
FIG. 4 is a detailed schematic diagram of the mobile wallet computing system of FIG. 1, according to an example embodiment.

Referring now to FIG. 4, a detailed schematic diagram of the mobile wallet computing system 106 is shown, according to an example embodiment. As shown in FIG. 4, the mobile wallet computing system 106 includes a network interface 400, a processing circuit 402, and a mobile wallet system 404. The network interface 400 includes program logic that facilitates connection of the mobile wallet computing system 106 and other components of the system 100.

The processing circuit 402 includes a processor 406 and a memory 408. As shown in FIG. 4, the memory 408 includes a mobile wallet database 410. The mobile wallet database 410 is structured to retrievably store information regarding mobile wallet accounts held by various users, such as information for a mobile wallet account held by the user of the user mobile device 102. For instance, the mobile wallet database 410 may store information related to the user and/or the user mobile device 102, such as authentication information (e.g., username/password combinations, device authentication tokens, security question answers, etc.) as part of activating a mobile wallet for the user. In mobile wallet implementations including HCE, the mobile wallet database 410 may further store information for the usable objects that the user has registered with the user's mobile wallet, as well as usable objects that third parties have provisioned to the user's mobile wallet. Furthermore, the mobile wallet database 410 may include rules configured by the third party computing system 104 for usable objects registered by the third party computing system 104 and provisioned to the user's mobile wallet. In various embodiments, the mobile wallet database 410 is structured as one or more remote data-storage facilities (e.g., cloud servers).

In some arrangements, the mobile wallet database 410 also includes a token vault that is maintained by the mobile wallet computing system 106. The token vault may include a lookup table maintaining tokens associated with various tokenized usable objects. The token vault and the token generation process are described in further detail below with respect to the token service provider computing system 108.

The mobile wallet system 404 is structured to provide mobile wallet services for the user, including providing a mobile wallet in the user mobile device 102. In some embodiments, the mobile wallet system 404 is structured to provide a mobile wallet client application (e.g., the mobile wallet application 206 described above) on the user mobile device 102. In this regard, the mobile wallet system 404 enables activation and registration of a mobile wallet account for the user, presents the user with various user interfaces enabling the user to use and manage the mobile wallet (e.g., register usable objects to the user's mobile wallet), and enables the user to perform transactions using the mobile wallet. Additionally, the mobile wallet system 404 is further structured to interface with the third party computing system 104 such that the third party computing system 104 can register usable objects to the user's mobile wallet and manage the user's access to the registered usable objects in the user's mobile wallet.

As shown in FIG. 4, the mobile wallet system 404 includes an application interface circuit 412, a user interface management circuit 414, a mobile wallet account activation circuit 416, a usable object registration circuit 418, a rules configuration circuit 420, an access management circuit 422, and a notification circuit 424. As shown, each of these circuits may be communicably and operatively coupled to each other and to the mobile wallet database 410. However, other embodiments of the mobile wallet system 404 may include more or fewer circuits without departing from the spirit and scope of the present disclosure. Further some embodiments of the mobile wallet system 404 may combine the activities of one circuit with another circuit to form a single circuit. Therefore, those of ordinary skill in the art will appreciate that the present arrangement is not meant to be limiting.

The application interface circuit 412 is structured to integrate payment-related functionalities and usable object registration into a user's mobile wallet, as well as enable usable object registration by the third party computing system 104 to the user's mobile wallet. In some arrangements, the application interface circuit 412 includes a series of software elements that provide accessibility to various functionalities discussed herein.

The user interface management circuit 414 is structured or configured to generate, update, control, or otherwise manage displays/graphical user interfaces of the mobile wallet. Moreover, in various arrangements, the user interface management circuit 414 updates the user interfaces responsive to user interactions with various portions of a mobile wallet interface presented to a user. In some arrangements, the user interface management circuit 414 may further be structured or configured to generate, update, control, or otherwise manage displays/graphical user interfaces displayed to the third party via the third party computing system 104. For example, if the third party is an individual, the user interface management circuit 414 may interface with the third party computing system 104 to display user interfaces that allow the third party to register usable objects to the user's mobile wallet (e.g., via a web-based application, via a banking application, etc.).

The mobile wallet account activation circuit 416 is structured to perform a activation process whereby a mobile wallet account for the user is created. In this regard, the mobile wallet account activation circuit 416 may present a first-time user with a plurality of activation interfaces (e.g., viewable by a web browser on the user mobile device 102) prompting the first-time user to input information such as user identifying information, login credentials, and the like. The activation interfaces may also ask the user permission to access, for example, user social media data, user accounts, and other data.

The usable object registration circuit 418 is structured to perform a registration process whereby usable objects are registered and provisioned to a user's mobile wallet. As discussed herein, usable objects may be registered and provisioned to the user's mobile wallet by the user or by a provisioning party (e.g., by a third party or by a secondary mobile wallet user, as described in further detail below). In this regard, the usable object registration circuit 418 may present the user or third party with a plurality of registration interfaces (e.g., shown to the user via the mobile wallet application 206) prompting the user or a third party to input information relating to a usable object to be registered (e.g., to manually input a PAN, a barcode, a driver's license number, and so on, to take a picture of the usable object, etc.). As an illustration, the registration interfaces may prompt the user or third party to register a payment card by manually inputting a PAN for the payment card or by taking a picture of the payment card using the camera on a smartphone. The usable object registration circuit 418 then receives the input information. Alternatively, or additionally, the usable object registration circuit 418 may simply receive information relating to a usable object from the user mobile device 102 and/or the third party computing system 104. For example, the usable object registration circuit 418 may receive information for a usable object generated by the usable object provisioning circuit 304 of the third party computing system 104. Furthermore, in some embodiments, the usable object registration circuit 418 may interface and extract information relating to an item to be registered from various user and/or third party accounts that the user and/or third party has given the usable object registration circuit 418 permission to access.

In various embodiments, once the usable object registration circuit 418 has received information for a usable object from the user or a provisioning party, the usable object registration circuit 418 is configured to store the information in the mobile wallet database 410. If the usable object is tokenizable (e.g., the usable object is a payment card), the usable object registration circuit 418 is configured to facilitate the tokenization of the usable object and the provisioning of the token to the user's mobile wallet on the user mobile device 102. For example, the usable object registration circuit 418 is configured to communicate with the token service provider computing system 108 to tokenize the usable object. Alternatively, if the usable object cannot be tokenized or does not need to be tokenized (e.g., the token is an e-ticket or a photo identification card), the usable object registration circuit 418 may instead provide a digital representation of the usable object (e.g., a scan of the usable object or a digital version of the usable object) to the mobile wallet on the user mobile device 102.

The rules configuration circuit 420 is structured to facilitate the third party in setting up rules for a usable object that the third party has provisioned to the user's mobile wallet. In some arrangements, the rules configuration circuit 420 may present the third party with a plurality of interfaces via the third party computing system 104 that facilitate the third party in setting up the one or more rules relating to the provisioned usable object. The rules configuration circuit 420 then collects the inputs from the third party in response to the user interfaces. Alternatively, the rules configuration circuit 420 may simply receive rules from the third party computing system 104 (e.g., the third party is a merchant, and the third party computing system 104 automatically submits standard rules for the usable object). Regardless, once the rules configuration circuit 420 receives the rules from the third party computing system 104, the rules configuration circuit 420 retrievably stores the rules in the mobile wallet database 410.

Figure 18:
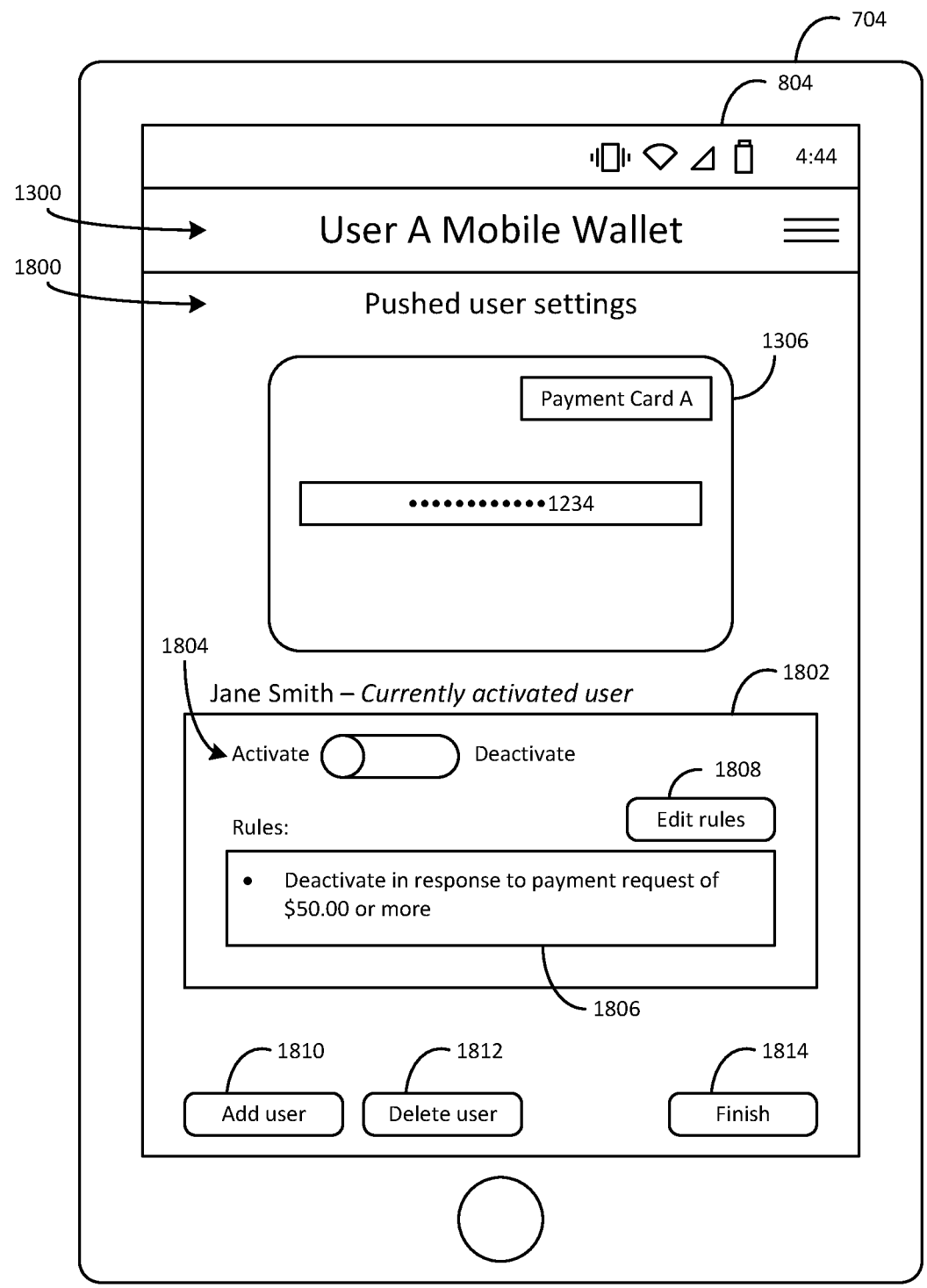

The access management circuit 422 is structured to manage the active status of a usable object provisioned to the user's mobile wallet by the third party computing system 104. In some embodiments, the access management circuit 422 interfaces with the third party computing system 104 and receives an indication from the third party computing system 104 as to whether the usable object should be active or inactive. For example, the access management circuit 422 may present the third party with a plurality of interfaces via the third party computing system 104 (e.g., through a web-based application running on the third party computing system 104) that facilitate the third party in activating and deactivating the usable object (e.g., by presenting the user with a button that the user can toggle to activate and deactivate the usable object, as shown in FIG. 18).

In other embodiments, alternatively or additionally, the access management circuit 422 automatically activates or deactivates the usable objects based on activation or deactivation conditions associated with the rules received by the rules configuration circuit 420 and stored in the mobile wallet database 410. Accordingly, in such embodiments, the access management circuit 422 is configured to continuously monitor the context of the user (e.g., monitor the user mobile device 102, monitor the environment of the user, etc.) to determine whether the conditions of the rules for a given usable object are fulfilled. In one embodiment, the access management circuit 422 monitors the user mobile device 102 and uses one or more applications and/or one or more functionalities of the user mobile device 102 to determine whether conditions of the rules are fulfilled. For example, the access management circuit 422 may determine whether the user is within a geofence by using GPS functionalities of the user mobile device 102, using a Wi-Fi network the user mobile device 102 is connected to, and so on. In another embodiment, the access management circuit 422 determines whether conditions of the rules are fulfilled using internal functionalities of the mobile wallet computing system 106. For example, the mobile wallet computing system 106 may include an internal clock, and the access management circuit 422 may use the internal clock to determine whether a day/week/month access limit condition is fulfilled. In a third embodiment, the access management circuit 422 may determine whether conditions of the rules are fulfilled by interfacing with functionalities provided by outside parties, such as by interfacing with an online calendar of the user. In a fourth embodiment, the access management circuit 422 determines whether conditions of the rules are fulfilled based on purchase information transmitted to the mobile wallet computing system 106 (e.g., by a point-of-sale device or by the user mobile device 102) as part of a mobile wallet transaction. For example, the purchase information may include an MCC for the merchant the user is making the purchase from, and the access management circuit 422 may determine whether a merchant limitation is fulfilled based on the MCC.

If the access management circuit 422 receives an indication that the usable object should be made currently usable, or "active," or should be made currently unusable, or "inactive," from the third party computing system 104, or if the access management circuit 422 determines that the conditions defined by the rules for a usable object are fulfilled, the access management circuit 422 modifies the user's access to the usable object accordingly. For example, in embodiments of the mobile wallet including HCE, the access management circuit 422 may delete the token or other representation of the usable object from the user mobile device 102. Alternatively, the access management circuit 422 may delete the token for the usable object in the token vault or prevent a new token representing the usable object from being provisioned to the user mobile device 102 once an old token for the usable object expires. Conversely, the access management circuit 422 may provision the token or other representation of the usable object to the user mobile device 102. As another example, in some embodiments, the access management circuit 422 may take steps to prevent the usable object from being successfully used, such as denying a transaction request received from the user mobile device 102 using the token or alerting the issuer computing system 110 to deny any transaction payments requested by the user with the usable object. Otherwise, the access management circuit 422 may take steps to allow the usable object to be used, such as alerting the issuer computing system 110 to allow transaction payments requested by the user with the usable object.

In other embodiments, the access management circuit 422 may not directly activate or deactivate the usable object in the user's mobile wallet on the user mobile device 102. Rather, the access management circuit 422 may configure the mobile wallet application 206 to activate and deactivate the usable object in the user's mobile wallet. For example, the access management circuit 422 may provide the rules configured by the third party to the mobile wallet application 206. The mobile wallet application 206 may then determine whether the activation or deactivation conditions of the rules are fulfilled and activate or deactivate the usable object in the mobile wallet accordingly.

In certain embodiments, the access management circuit 422 may alternatively allow partial mobile wallet transactions to proceed if conditions of one or more rules for the usable object are fulfilled. As an example, the third party may configure a purchase limit condition for the usable object. Subsequently, if the access management circuit 422 receives a purchase request from the user mobile device 102 that violates the purchase limit condition, the access management circuit 422 may authorize the transaction amount up to the purchase limit (e.g., by transmitting the purchase request in the amount up to the purchase limit to the issuer or a card network associated with the usable object). The access management circuit 422 may then deny the remainder of the transaction request. As another example, the third party may configure a product limit for the usable object. As such, if the access management circuit 422 receives a purchase request from the user mobile device 102 including allowed products and prohibited products, the access management circuit 422 may authorize the transaction only for the allowed products.

In still other embodiments, the access management circuit 422 may transmit a notification (e.g., by the notification circuit 424) to the third party when the user requests a mobile wallet transaction for a deactivated usable object and/or a mobile wallet transaction that violates one or more rules (e.g., meets the deactivation condition(s) for the one or more rules) for the usable object. The third party can then respond to the notification within a certain amount of time to authorize the transaction (e.g., by transmitting a purchase request to the issuer or card network associated with the usable object, by provisioning a representation of the usable object to the user's mobile wallet on the user mobile device 102, etc.), after which the access management circuit 422 allows the transaction to proceed.

The notification circuit 424 is configured to transmit or to facilitate the transmission of notifications relating to a mobile wallet. In some arrangements, the notification circuit 424 is configured to transmit various notifications to the user mobile device 102 (e.g., via the mobile wallet application 206). For example, the notification circuit 424 may transmit a notification to the user mobile device 102 when the third party has provisioned a usable object to the user's mobile wallet (e.g., as an email, as a text message, to the mobile wallet application 126 which then displays the notification as a push notification on the user mobile device 102, etc.). As another example, the notification circuit 424 may transmit a notification to the user mobile device 102 when the third party, either manually or automatically via rules, has modified the user's access to the usable object. As a third example, the notification circuit 424 may transmit a notification to the user mobile device 102 informing the user of changes that the third party has made to rules for a usable object. In other arrangements, the notification circuit 424 is configured to transmit various notifications to the third party computing system 104. As an example, the notification circuit 424 may notify the third party computing system 104 when the user has performed a mobile wallet transaction with the usable object, when the rules have caused the usable object to be automatically activated or deactivated within the user's mobile wallet, and so on. Moreover, in various arrangements, the notification circuit 424 may transmit messages received from the user mobile device 102 to the third party computing system 104. For example, the notification circuit 424 may transmit a message from the user mobile device 102 to the third party computing system 104 asking the third party to confirm that the user is authorized to use the usable object or asking the third party to authorize a transaction carried out with the usable object.

The token service provider computing system 108 includes a computing system configured to provision payment credentials (e.g., payment tokens) on behalf of a mobile wallet user. The token service provider computing system 108 may be operated by a credit card network or other type of payment system, an acquiring or issuing financial institution (e.g., associated with the issuer computing system 110 or associated with the user), a merchant, a mobile wallet provider (e.g., mobile wallet computing system 106), and/or another provider. Accordingly, the token service provider computing system 108 may be a separate computing system, as shown in FIG. 1, or the token service provider computing system 108 may be part of, for example, the mobile wallet computing system 106 and/or the issuer computing system 110.

Figure 5:
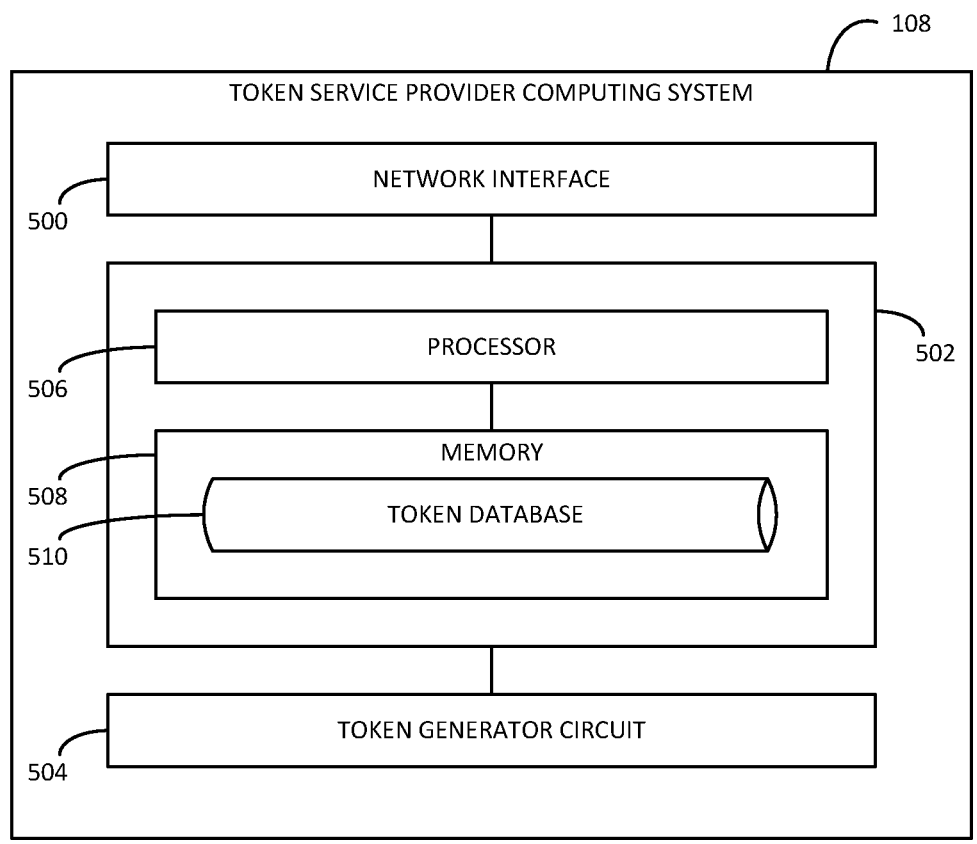
FIG. 5 is a detailed schematic diagram of the token service provider computing system of FIG. 1, according to an example embodiment.

Referring now to FIG. 5, a detailed schematic diagram of the token service provider computing system 108 is shown, according to an example embodiment. As shown, the token service provider computing system 108 includes a network interface 500, a processing circuit 502, and a token generator circuit 504. The network interface 500 includes program logic that facilitates connection of the token service provider computing system 108 to other components of the system 100.

The processing circuit 502 includes a processor 506 and a memory 508. As shown in FIG. 5, the memory 508 includes a token database 510. The token database 510 is structured to retrievably store tokens generated and provisioned by the token service provider computing system 108, as described herein. In various embodiments, the token database 510 may include a token vault with a lookup table maintaining tokens associated with various usable objects registered by the user or by the third party. The tokens stored therein may be generated internally (e.g., at the token service provider computing system 108) or by other entities (e.g., at the mobile wallet computing system 106). For example, in one embodiment, the token vault may include a lookup table including tokens that have been generated and assigned to registered usable objects such as payment cards. In some arrangements, the mobile wallet computing system 106 may further include an associated token management system (not shown) including one or more algorithms, processes, formulas, and so on that facilitate the efficient searching of the information stored in the token vault.

The token generator circuit 504 is configured to facilitate various services associated with payment tokens, including generating and provisioning new tokens, authorizing a token for use in a financial transaction, storing tokens for usable objects (e.g., in the token database 510), and managing the life cycles of the tokens. For example, the token generator circuit 504 may manage expiration times for various tokens, after which the tokens are no longer valid, and download new tokens to the user mobile device 102 to replace expired tokens. Additionally, the token generator circuit 504 may be configured to provision tokens to the user mobile device 102 in response to a request received from the mobile wallet computing system 106.

More specifically, the token generator circuit 504 is configured to generate and provision tokens for usable objects stored in the mobile wallet database 410 using tokenization processes. For example, the mobile wallet computing system 106 may request, from the token service provider computing system 108, a token for a usable object registered by the third party. In response, the token generator circuit 504 may create a token by generating a random number, by generating a random string of alphanumeric characters, by inputting a number associated with each item into a tokenization algorithm (e.g., computing a hash of a PAN of a usable payment object), and the like for each requested usable object. The token generator circuit 504 may then store each token, as well as the token's association with the corresponding usable object, in the token database 510. Alternatively, or additionally, the token generator circuit 504 may provide the token to the mobile wallet computing system 106, which may store the token in a token vault maintained internally within the mobile wallet computing system 106 (e.g., within the mobile wallet database 410).

As used herein, an "issuer" is a party with which the user, the third party, or, as discussed in further detail below, a secondary mobile wallet user holds one or more accounts (e.g., a demand deposit account, credit account, brokerage account, etc.) and that enables payments on behalf of the user. For example, an issuer may be a banking institution with which the user or the third party holds one or more accounts (i.e., the issuing entity of, for example, a payment card of the user, such as a credit card). As another example, an issuer may be a credit card company with which the user or the third party holds a credit card account. Additionally, an issuer may be responsible for the creation of a physical usable object, such as a credit card, that may be provisioned to the user's mobile wallet. Accordingly, in the context of the present disclosure, the issuer can include commercial or private banks, credit unions, investment brokerages, mobile wallet providers (e.g., the issuer computing system 110 may include the mobile wallet computing system 106), and so on.

As such, the issuer computing system 110 is a computing system associated with one or more financial accounts held by the user or the third party.

Figure 6:
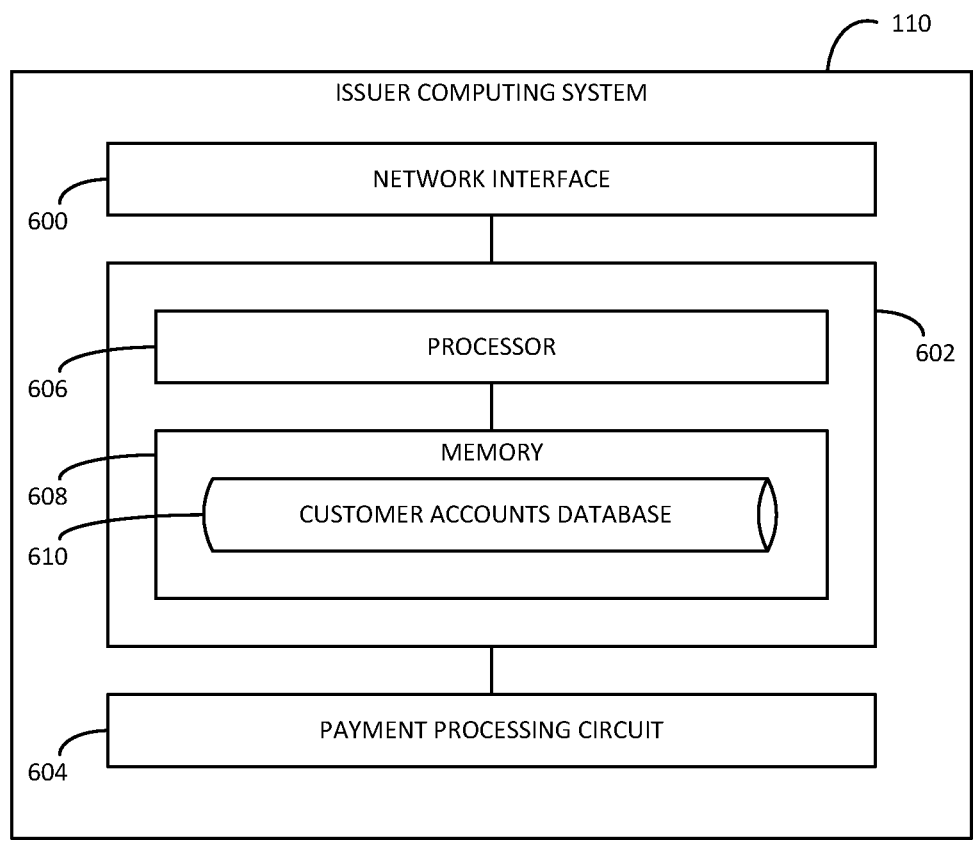
FIG. 6 is a detailed schematic diagram of the issuer computing system of FIG. 1, according to an example embodiment.

Referring now to FIG. 6, a detailed schematic diagram of the issuer computing system 110 is shown, according to an example embodiment. As shown in FIG. 6, the issuer computing system 110 includes a network interface 600, a processing circuit 602, and a payment processing circuit 604. The network interface 600 includes program logic that facilitates connection of the issuer computing system 110 to other components of the system 100.

The processing circuit 602 includes a processor 606 and a memory 608. As shown in FIG. 6, the memory 608 includes a customer accounts database 610. The customer accounts database 610 is structured to retrievably store customer information, such as information relating to one or more accounts held by the user and/or third party with the issuer. For example, the customer accounts database 610 may include personal information (e.g., names, addresses, phone numbers, etc.), authentication information (e.g., username/password combination, device authentication tokens, security question answers, unique customer identifiers, biometric data, etc.), and financial information (e.g., token information, account numbers, account balances, available credit, credit history, transaction histories, etc.) relating to various customers of the issuer, including the user and/or third party.

As described above, in some arrangements, the issuer computing system 110 is associated with the issuer of a usable object held by the user or third party. As an example, the issuer may be the issuer of a credit card held by the third party. As another example, the issuer may be the issuer of a credit card held by the user and affiliated with the third party, such as a rewards credit card affiliated with a merchant. In other arrangements, the third party holds one or more accounts with the issuer associated with the issuer computing system 110. In either of these arrangements, the payment processing circuit 604 of the issuer computing system 110 is configured to process a payment with the usable object, either from an account held by the user with the issuer or from an account held by the third party with the issuer.

As an example, the third party computing system 104 may provision a voucher for an item to the user's mobile wallet. The user may then purchase the item from a merchant using the voucher in the user's mobile wallet at a point-of-sale device. The point-of-sale device sends the payment request to the issuer computing system 110 (e.g., via the mobile wallet computing system 106), and the issuer computing system 110 makes a payment in the amount of the item from an account held by the third party to an account held by the merchant (e.g., at a separate acquirer associated with the merchant). In another example, the user opens a credit card account with the issuer, the credit card account being associated with the third party. The third party computing system 104 provides the information about the credit card to the mobile wallet computing system 106, which tokenizes the credit card (e.g., using the token service provider computing system 108) and provisions the token to the mobile wallet on the user mobile device 102. When the user subsequently makes a purchase using the credit card token in the user's mobile wallet, the issuer computing system 110 makes a payment from the credit card account held by the user to an account held by the merchant.

However, those of skill in the art will understand that in certain embodiments of the system 100, the system 100 may not include the issuer computing system 110 or may instead include a different computing system. For example, the third party computing system 104 may provision a loyalty card to the user's mobile wallet, in which case the issuer computing system 110 may be replaced by a loyalty card management system in the system 100.

Figure 7:
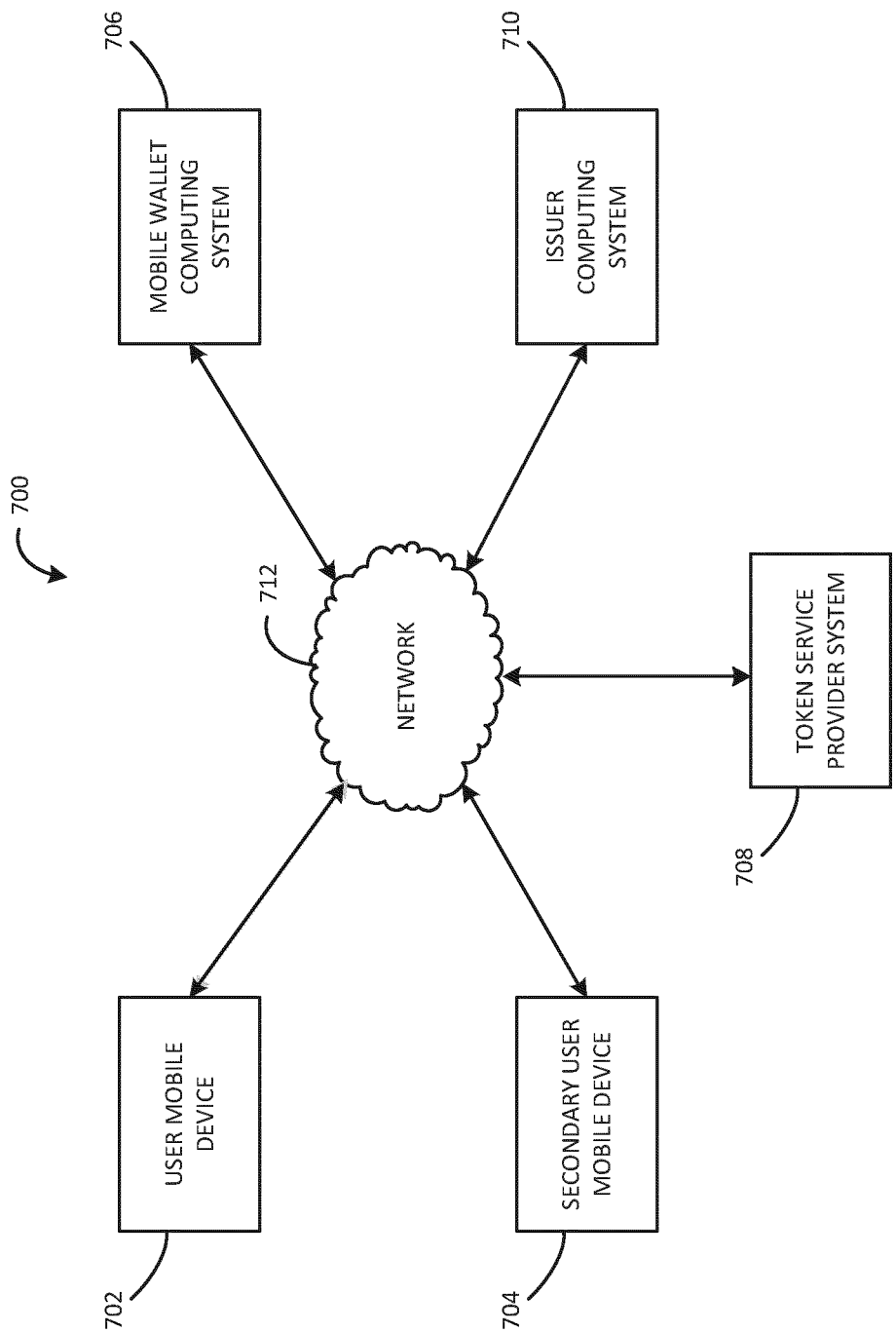
FIG. 7 is a system for pushing usable objects from one mobile wallet to another mobile wallet, according to an example embodiment.

Referring now to FIG. 7, a system 700 for pushing usable objects to a mobile wallet is shown, according to an example embodiment. In the system 700, the provisioning party is another user with a mobile wallet account. The system 700 includes a user mobile device 702, a secondary user mobile device 704, a mobile wallet computing system 706, a token service provider computing system 708, and an issuer computing system 710 connected by a secure network (e.g., network 712). In operation, similar to the system 100 discussed above, a user may activate a mobile wallet account with the mobile wallet computing system 706 via the user mobile device 702. Furthermore, a second user (referred to herein as a "secondary user") may activate a mobile wallet account with the mobile wallet computing system 706 via the secondary user mobile device 704. The secondary user may then register and provision a usable object to the secondary user's mobile wallet using the provisioning process described above with respect to system 100. Subsequently, the secondary user may "push" (e.g., cause the provisioning of) the usable object to the user's mobile wallet on the user mobile device 702 through the system 100, as described in further detail below. Furthermore, the secondary user may remotely activate and deactivate the pushed usable object in the user's mobile wallet and/or configure rules for the pushed usable object that cause the usable object to be automatically activated or deactivated within the mobile wallet on the user mobile device 702.

In various embodiments, the user mobile device 702 is structured similarly to the user mobile device 102 described above with reference to FIGS. 1 and 2 (e.g., having a network interface, an input/output circuit, a display, and a mobile wallet application), except that the user mobile device 702 is further structured to receive and use pushed usable objects from the secondary user mobile device 704 as described below. In various arrangements, the user mobile device 702 is further configured to otherwise interact with the secondary user mobile device (e.g., through the user mobile device 702 submitting messages to and receiving messages from the secondary user mobile device 704).

Additionally, instead of a third party computing system 104, the system 700 includes a secondary user mobile device 704. Similar to the user mobile device 702, the secondary user mobile device 704 includes any type of mobile device operated by a secondary user in connection with services provided by a mobile wallet provider. As such, the secondary user mobile device 704 includes, but is not limited to, a phone (e.g., a smartphone), a computing device (e.g., a tablet computer, a laptop computer, a personal digital assistant, etc.), a wearable device (e.g., a smart watch, smart glasses, a smart bracelet, etc.), and so on. As shown, the secondary user mobile device 704 is a smartphone.

Figure 8:
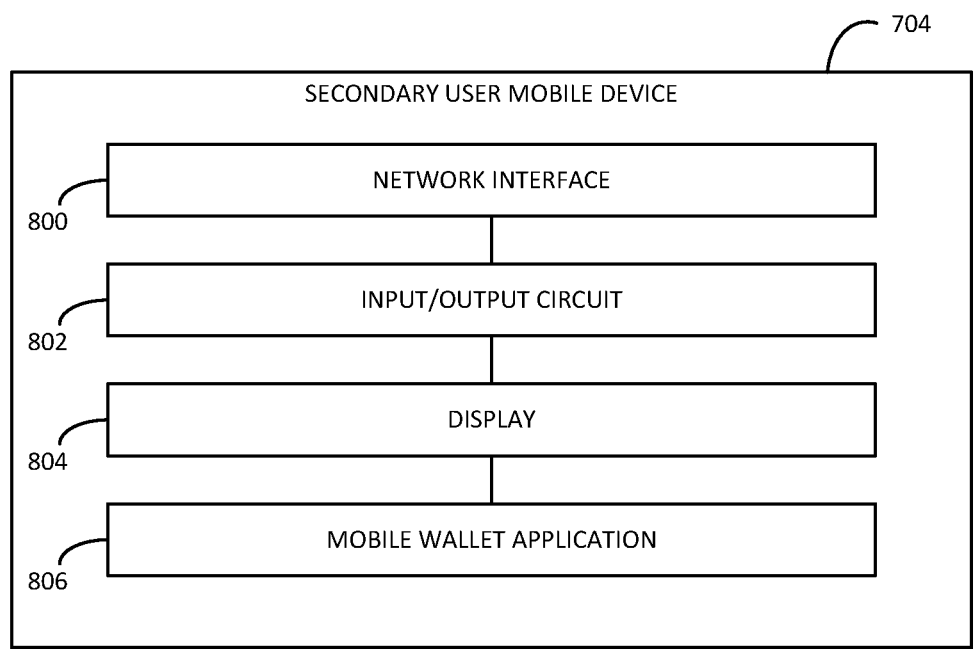
FIG. 8 is the secondary user mobile device of FIG. 7, according to an example embodiment.

Referring now to FIG. 8, a detailed schematic diagram of the secondary user mobile device 704 is shown, according to an example embodiment. As shown in FIG. 8, the secondary user mobile device 704 includes a network interface 800, an input/output circuit 802, a display 804, and a mobile wallet application 806. In various embodiments, the network interface 800, input/output circuit 802, and display 804 are configured similarly to the network interface 200, input/output circuit 202, and display 204 of the user mobile device 102 described above.

In various embodiments, the secondary user mobile device 704 includes a memory comprising non-transitory machine readable storage media having the mobile wallet application 806 stored thereon. The memory is coupled to a processor, and the mobile wallet application 806 includes instructions that are executable by the processor. Furthermore, in various embodiments, the mobile wallet application 806 is configured similarly to the mobile wallet application 206 of the user mobile device 102 such that the secondary user can use the mobile wallet application 806 to register usable objects to the secondary user's mobile wallet and perform mobile wallet transactions with those usable objects. Additionally, the mobile wallet application 806 is configured to enable the secondary user to push usable objects to the user's mobile wallet. In some arrangements, the mobile wallet application 806 is configured to display user interfaces to the secondary user (e.g., via the display 804) whereby the secondary user can select a usable object and enter information regarding a user to whom the secondary user wishes to push the usable object. The mobile wallet application 806 then transmits that information to the mobile wallet computing system 106, which provisions the usable object (e.g., in the form of a token or other digital representation) to the mobile wallet on the user mobile device 102.

In other arrangements, the mobile wallet application 806 may display user interfaces to the secondary user enabling the secondary user to select a mobile wallet account for another user of the mobile wallet computing system 706 (e.g., by inputting a username of the other user, by inputting biographical information about the other user, etc.). Once the other user is identified, the secondary user can input a preference to link the secondary user's mobile wallet with the mobile wallet of the selected user, which the mobile wallet application 806 submits to the mobile wallet computing system 106. The linking process is described in further detail below with reference to FIG. 8. Once the two mobile wallets are linked, the mobile wallet application 806 may display user interfaces allowing the secondary user to express a preference to push any of the usable objects in the secondary user's mobile wallet to the user's mobile wallet. The mobile wallet application 806 transmits the pushing preferences to the mobile wallet computing system 106, which provisions the usable object(s) accordingly.

As still other arrangements, the mobile wallet application 806 may be configured to communicate with other mobile wallet applications running on other mobile devices, including the mobile wallet application on the user mobile device 702, through the input/output circuit 802 (e.g., through an NFC or RFID device included as part of the input/output circuit 802). When the secondary user provides an input to the mobile wallet application 806 indicating that the secondary user would like to provision a usable object to the user's mobile wallet, the mobile wallet application 806 is thus configured to display user interfaces instructing the secondary user to bring the secondary user mobile device 704 in proximity to the user mobile device 702. When the user mobile device 102 and the secondary user mobile device 704 are in sufficient proximity to each other (e.g., close enough for an NFC tap), the mobile wallet application 806 begins a communication session with the mobile wallet application on the user mobile device 702, and the mobile wallet application 806 provisions the usable object to the user's mobile wallet via the communication session. The mobile wallet application 806 may also transmit a notification to the mobile wallet computing system 706 indicating that the usable object has been provisioned to the user's mobile wallet.

Additionally, the mobile wallet application 806 is configured to facilitate the secondary user in managing the user's access to the provisioned usable object in the user's mobile wallet. In various arrangements, the mobile wallet application 806 is configured to display user interfaces to the secondary user that allow the secondary user to manually activate/deactivate the usable object and/or configure rules for the usable object, similar to the usable object management circuit 306 described above with respect to the third party computing system 104.

In various embodiments, the mobile wallet computing system 706 is structured similarly to the mobile wallet computing system 106. For example, the mobile wallet computing system 706 may include a network interface, a processing circuit including a mobile wallet database, and a mobile wallet system that are similar to the network interface 400, processing circuit 402 with mobile wallet database 410, and mobile wallet system 404 shown in FIG. 4. However, the mobile wallet computing system 706 is further structured to permit, enable, facilitate, manage, process, and otherwise allow mobile wallet transactions for the secondary user as well as for the user. For example, the mobile wallet computing system 706 may activate a mobile wallet for the secondary user, provision usable objects registered by the secondary user to the secondary user's mobile wallet, and process mobile wallet transactions using the provisioned usable objects.

Additionally, in various embodiments, the mobile wallet computing system 706 is configured to link the mobile wallet accounts of various users, such as the user's mobile wallet and the secondary user's mobile wallet, in response to linking request from one or both users to link their mobile wallet accounts. In some arrangements, the mobile wallet computing system 706 may require the user or the secondary user to perform an authentication process (e.g., input a password or piece of biographical information) before linking their mobile wallet accounts. In other arrangements, the mobile wallet computing system 706 may require the non-requesting user to confirm that the non-requesting user would like to link accounts with the requesting user.

Furthermore, the mobile wallet computing system 706 is configured to facilitate the secondary user in pushing usable objects registered to the secondary user's mobile wallet to the user's mobile wallet. In various arrangements, the mobile wallet computing system 706 facilitates the secondary user in pushing the usable objects similarly to how the mobile wallet computing system 706 facilitates the third party in registering and provisioning usable objects to the user's mobile wallet as discussed above with respect to FIG. 4 above. Additionally, the mobile wallet computing system 706 may be configured to receive requests from the user mobile device 702 to pull objects from the secondary user's mobile wallet (e.g., pull a usable object that the secondary user has made public in the secondary user's mobile wallet, pull a usable object that the user can view because the user's mobile wallet is linked to the secondary user's mobile wallet, etc.). In some arrangements, the mobile wallet computing system 706 may provide such a request to the secondary user mobile device 704. The secondary user, via the mobile wallet application 806, can then authorize the pulling of the usable object in response to which the mobile wallet computing system 706 provisions the usable object to the user mobile device 702. In other arrangements, the mobile wallet computing system 706 may automatically provision a requested usable object to the user's mobile wallet based on whether the user or a mobile wallet transaction desired by the user fulfills conditions defined by the rules for the object configured by the secondary user (e.g., the rules allow for a usable object to be provisioned to the mobile wallet of a relative of the secondary user, and the user is the secondary user's wife).

In various embodiments, the token service provider computing system 708 is also configured similarly to the token service provider computing system 108 described above with reference to FIG. 5. For example, the token service provider computing system 708 may include a network interface, a processing circuit including a token database, and a token generator circuit that are similar to the network interface 500, processing circuit 502 including the token database 510, and token generator circuit 504 of the token service provider computing system 108. However, in the system 700, the token service provider computing system 708 is further configured to generate, and in some arrangements provision, tokens relating to usable objects registered by the secondary user.

The issuer computing system 710 is a computing system associated with one or more financial accounts (e.g., a demand deposit account, credit account, brokerage account, etc.) held by the user or the secondary user. In various embodiments, the issuer computing system 710 is structured similarly to the issuer computing system 110 described above with reference to FIGS. 1 and 6. For example, the issuer computing system 710 may include a network interface, a processing circuit with a customer accounts database, and a payment processing circuit that are structured similarly to the network interface 600, processing circuit 602 with customer accounts database 610, and payment processing circuit 604 of the issuer computing system 110 discussed above. Nevertheless, in various embodiments, the issuer computing system 710 is further configured to retrievably store customer information for the secondary user and/or process a payment from an account held by the secondary user at the issuer with the usable object. Moreover, similar to the system 100, the system 700 may not include the issuer computing system 710 or may include a different computing system.

Figure 9:
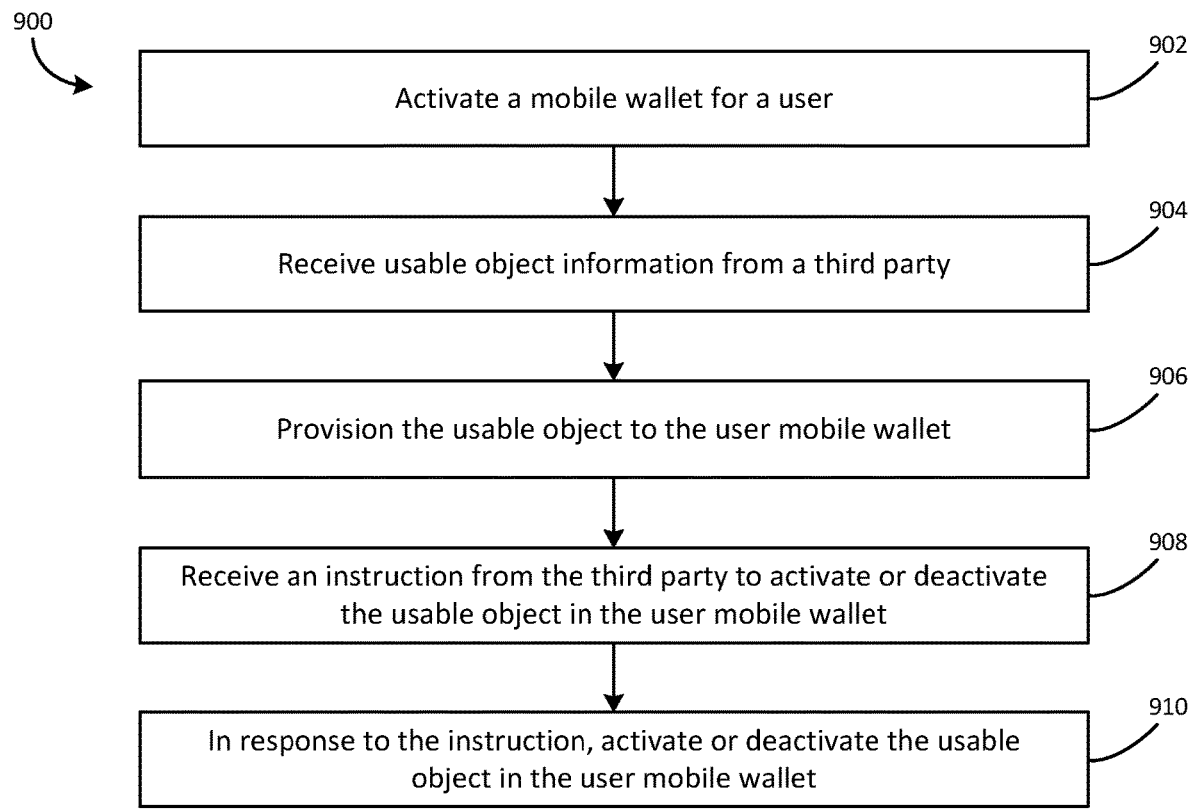
FIG. 9 is a flow diagram illustrating a process of third-party provisioning to a mobile wallet, according to an example embodiment.
Figure 10:
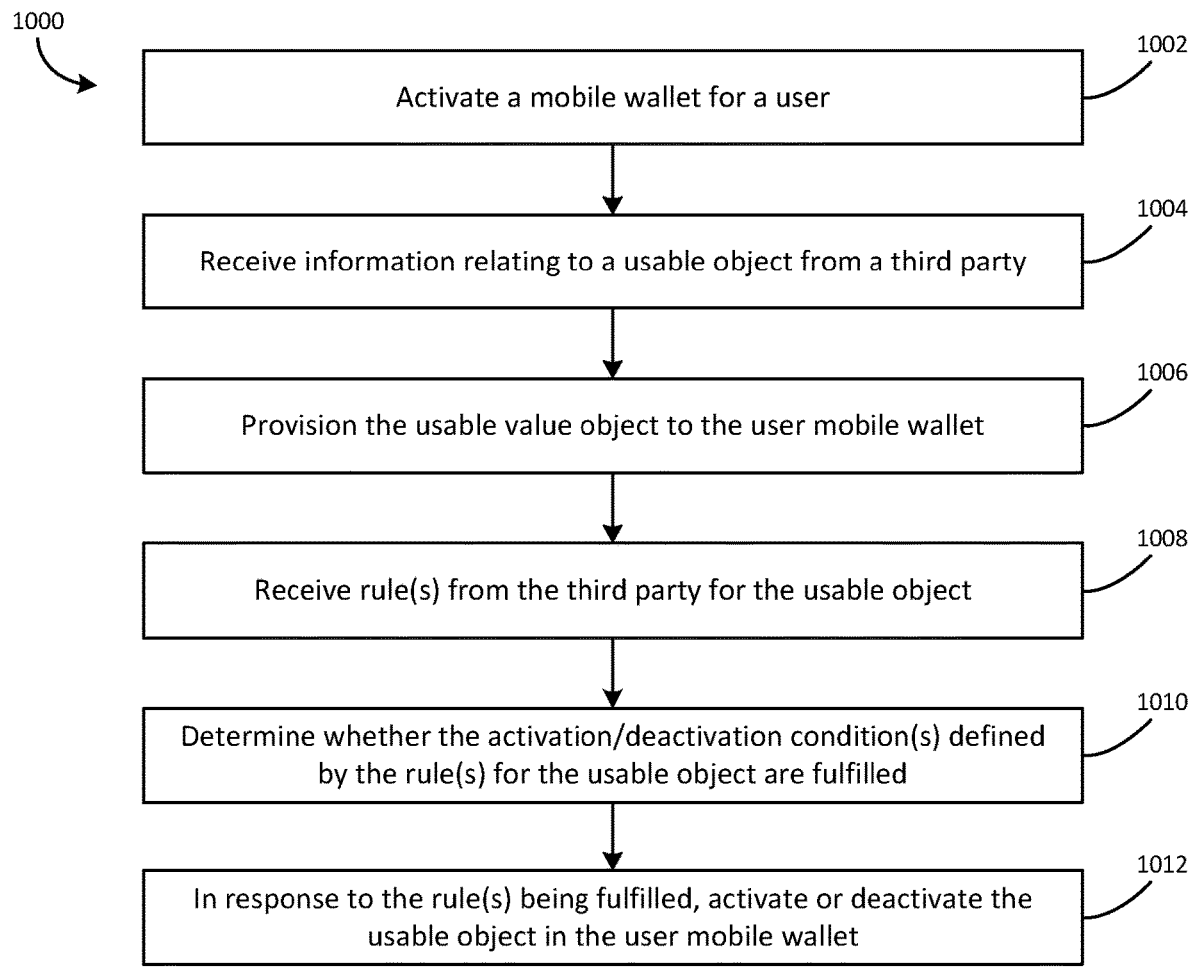
FIG. 10 is a flow diagram illustrating a process of third-party provisioning to a mobile wallet, according to a second example embodiment.

Referring now to FIGS. 9 and 10 in combination with FIGS. 1-6, example methods 900 and 1000 of third-party provisioning of a usable object through the system 100 are shown, according to example embodiments. In this regard, because methods 900 and 1000 may be implemented with the system 100 as illustrated in FIGS. 1-6, reference may be made to one or more components of FIGS. 1-6 in explaining methods 900 and 1000.

Referring first to FIG. 9 and method 900, at process 902, a mobile wallet for a user is activated. In some arrangements, the mobile wallet computing system 106 receives a request for a mobile wallet account from the user mobile device 102 (e.g., by the user accessing a website associated with the mobile wallet provider via the user mobile device 102, by downloading a mobile wallet application from an application store, etc.), from a computing system associated with the mobile wallet provider (e.g., via a computer at a brick-and-mortar location associated with the mobile wallet provider), and so on. The mobile wallet computing system 106 then authenticates the user (e.g., by verifying the user's phone number and email) and, if successful, activates a mobile wallet for the user. In other arrangements, a mobile wallet is preloaded onto the user mobile device 102, and the mobile wallet computing system 106 simply authenticates the activation of the mobile wallet with the user.

At process 904, information relating to a usable object is received from a third party that does not have a mobile wallet. In various arrangements, the mobile wallet computing system 106 receives information relating to a usable object from the third party via the third party computing system 104. Subsequently, at process 906, the usable object is provisioned to the user mobile wallet. In some arrangements, the usable object is a payment object. As such, the mobile wallet computing system 106 may store the information relating to the usable object in the mobile wallet database 410, tokenize the usable object (e.g., via the token service provider computing system 108), and provision the token to the user mobile device 102. In other arrangements, the usable object is not a payment object. Accordingly, the mobile wallet computing system 106 may provision another representation of the usable object to the user mobile device 102 (e.g., a scan of the usable object, a digital representation of the usable object, etc.). Alternatively, the mobile wallet computing system 106 may simply receive the information about the usable object, and the third party computing system 104 may communicate with the mobile wallet application 206 on the user mobile device 102 to provision the usable object to the user's mobile wallet.

At process 908, an instruction to activate or deactivate the usable object in the user mobile wallet is received from the third party. In various arrangements, the mobile wallet computing system 106 receives the activation/deactivation instruction from the third party computing system 104. Accordingly, at process 910, in response to the instruction, the usable object is activated or deactivated in the user mobile wallet, as described above. For example, the mobile wallet computing system 106 provisions a token or other representation of the usable object to the user mobile device 102, or deletes a token or other representation of the usable object on the user mobile device 102, in response to the instruction.

Referring now to FIG. 10 and method 1000, at process 1002, a mobile wallet for a user is activated. At process 1004, information relating to a usable object is received from a third party. At process 1006, the usable object is provisioned to the user mobile wallet. In various embodiments, processes 1002, 1004, and 1006 occur similarly to processes 902, 904, and 906 discussed above with respect to FIG. 9.

At process 1008, one or more rules relating to the usable object are received from the third party. In various embodiments, the mobile wallet computing system 106 receives one or more rules defining activation and/or deactivation conditions from the third party computing system 104 (e.g., a geofence, a purchase amount limit, a time limitation, a merchant limitation, a zip code use limitation, product code limits, limits on the hardware the mobile wallet can be used on, etc.). The mobile wallet computing system 106 then stores those rules in the mobile wallet database 410. It should be understood, however, that the order of processes 1004, 1006, and 1008 may differ in certain embodiments. For example the third party may submit the rules at the same time the third party provides the information relating to the usable object to the mobile wallet computing system 106.

At process 1010, whether the activation/deactivation condition(s) defined by the rule(s) for the usable object are fulfilled is determined. Accordingly, in various arrangements, the mobile wallet computing system 106 monitors the context of the user to determine whether the conditions defined by the rules for a given usable object are fulfilled (e.g., by interfacing with the user mobile device 102 and using functionalities of the user mobile device 102, by using internal functionalities of the mobile wallet computing system 106, by using functionalities provided by outside parties, etc.). At process 1012, in response to the condition(s)

being fulfilled, the usable object is activated or deactivated in the user mobile wallet. In various arrangements, the mobile wallet computing system 106 activates or deactivates the usable object similarly to process 910 of FIG. 9 described above. Alternatively, in other arrangements, the third party computing system 104 or the mobile wallet computing system 106 may provide the rules to the mobile wallet application 206 on the user mobile device 102. The mobile wallet application 206 may then determine whether the conditions of the rules for the usable object are fulfilled at process 1010 and activate/deactivate the usable object at process 1012.

Figure 11:
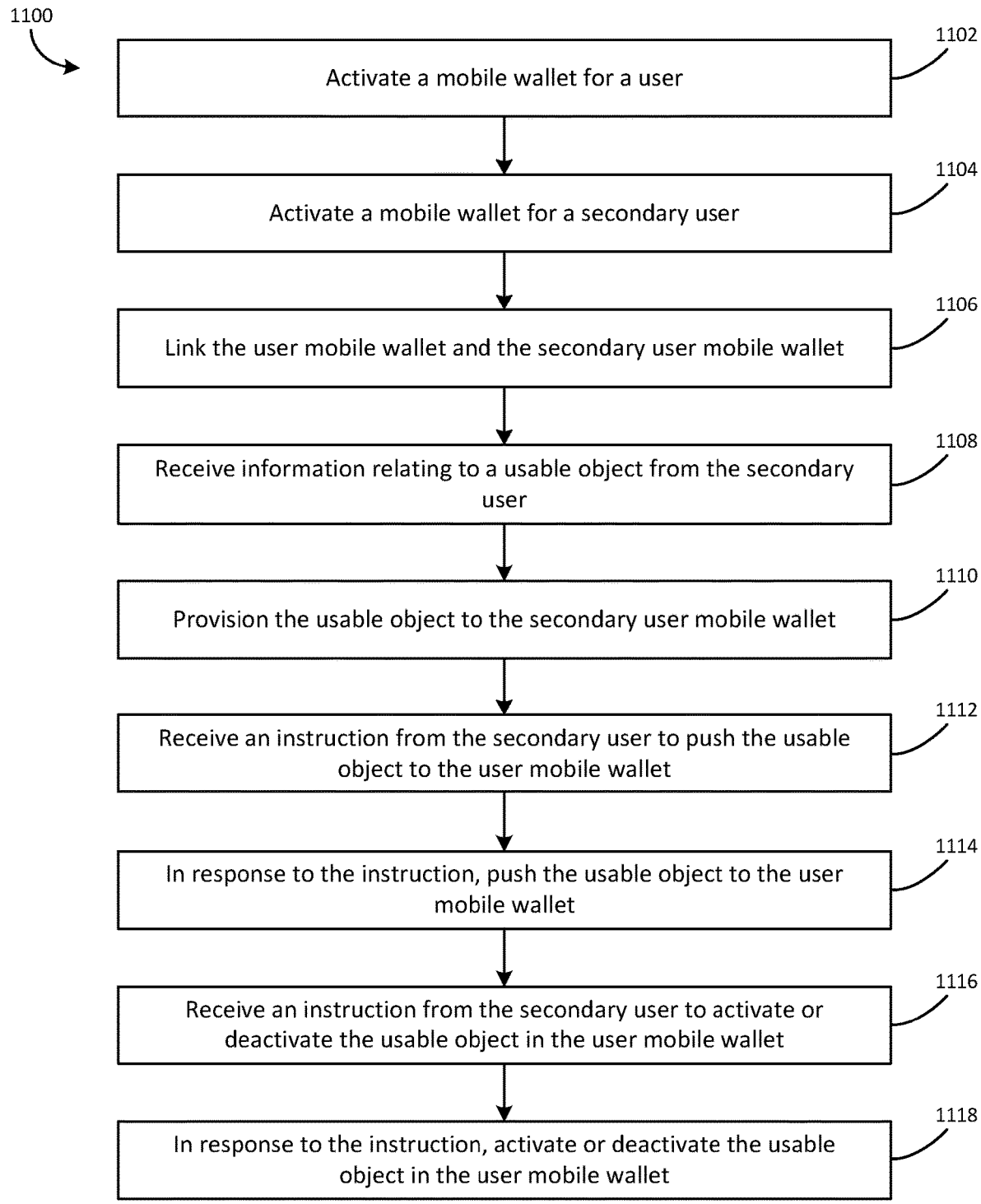
FIG. 11 is a flow diagram illustrating a process of pushing usable objects from one mobile wallet to another mobile wallet, according to an example embodiment.
Figure 12:
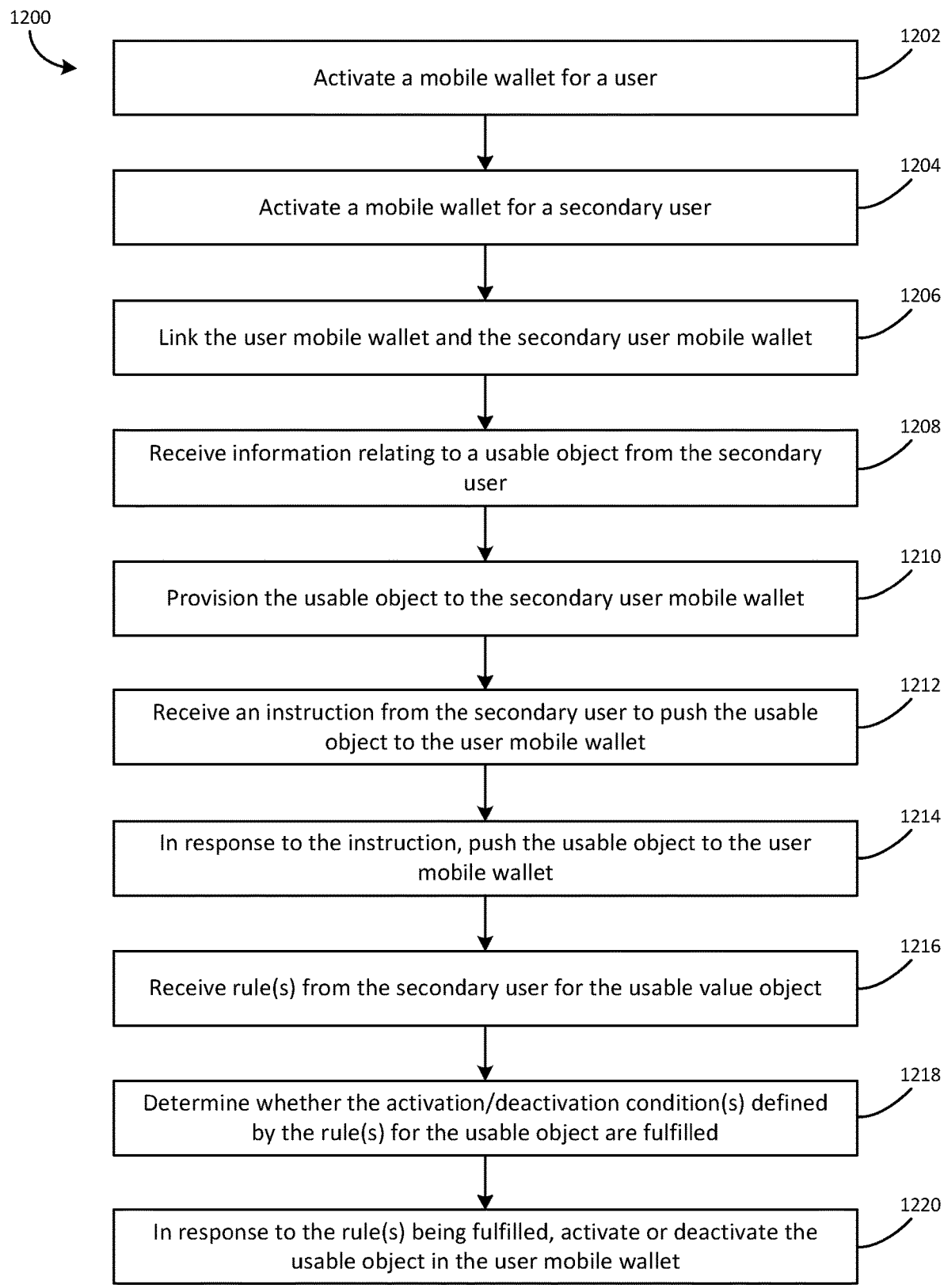
FIG. 12 is a flow diagram illustrating a process of pushing usable objects from one mobile wallet to another mobile wallet, according to a second example embodiment.

Referring now to FIGS. 11 and 12 in combination with FIGS. 7 and 8, example methods 1100 and 1200 of pushing a usable object to the user's mobile wallet through the system 700 are shown, according to example embodiments. In this regard, because methods 1100 and 1200 may be implemented with the system 700 as illustrated in FIGS. 7 and 8, reference may be made to one or more components of FIGS. 7 and 8 in explaining methods 1100 and 1200.

Referring first to FIG. 11 and method 1100, at process 1102, a mobile wallet for a user is activated. Additionally, at process 1104, a mobile wallet for a secondary user is activated. In various embodiments, processes 1102 and 1104 each occur similarly to process 902 discussed above with respect to FIG. 10.

At process 1106, the user mobile wallet and the secondary user mobile wallet are linked. In some arrangements, the mobile wallet computing system 706 receives a preference from the user via the user mobile device 702 and/or the secondary user via the secondary user mobile device 704 to link their mobile wallet accounts. The mobile wallet computing system 706 may further perform an authentication of the user and/or the secondary user in response to the request. Subsequently, the mobile wallet computing system 706 links the mobile wallet accounts for the user and the secondary user such that additional functionalities are available to the user and secondary user, such as pushing a usable from one mobile wallet to the other. In other arrangements, the mobile wallet computing system 706 receives a request from the user or the secondary user to link their mobile wallet accounts. The mobile wallet computing system 706 submits the request to the other of the user or the secondary user for approval and, in response to receiving the approval, links the two mobile wallet accounts.

At process 1108, information relating to a usable object is received from the secondary user. In various arrangements, the mobile wallet computing system 706 receives information relating to a usable object from the secondary user via the secondary user mobile device 704. Subsequently, at process 1110, the usable object is provisioned to the secondary user's mobile wallet. In some arrangements, the usable object is a payment object, and the mobile wallet computing system 706 tokenizes the usable payment object (e.g., via the token service provider computing system) and provisions the token to the secondary user mobile device 704. In other arrangements, the usable object is not a payment usable object, and the mobile wallet computing system 706 provisions another representation of the usable object to the secondary user mobile device 704 (e.g., a scan of the usable object, a digital representation of the usable object, etc.).

At process 1112, an instruction to push the usable object to the user's mobile wallet is received from the secondary user. In various arrangements, the mobile wallet computing system 706 receives an indication from the secondary user mobile device 704 identifying the usable object and requesting that the usable object be provisioned to the linked mobile wallet for the user. At process 1114, in response to the instruction, the usable object is pushed to the user's mobile wallet. Process 1114 may, in various arrangements, occur similarly to process 906 discussed above with respect to FIG. 10.

At process 1116, an instruction to activate or deactivate the usable object in the user's mobile wallet is received from the secondary user. In various arrangements, the mobile wallet computing system 706 receives the instruction from the secondary user mobile device 704. In response, at process 1118, the usable object is activated or deactivated in the user's mobile wallet. Process 1118 may, in various arrangements, occur similarly to process 910 discussed above with respect to FIG. 9.

Referring now to FIG. 12 and method 1200, at process 1202, a mobile wallet for a user is activated. At process 1204, a mobile wallet for a secondary user is activated. At process 1206, the user mobile wallet and the secondary user mobile wallet are linked. Further, at process 1208, information relating to a usable object is received from a secondary user. At process 1210, the usable object is provisioned to the secondary user mobile wallet. At process 1212, an instruction to push the usable object to the user's mobile wallet is received. Finally, at process 1214, in response to the instruction, the usable object is pushed to the user's mobile wallet. In various embodiments, processes 1202, 1204, 1206, 1208, 1210, and 1212 occur similarly to processes 1102, 1104, 1106, 1108, 1110, and 1112 described above with reference to FIG. 11.

Additionally, at process 1216, one or more rules relating to the usable object are received from the secondary user. In various embodiments, the mobile wallet computing system 706 receives one or more rules defining activation and/or deactivation conditions from the secondary user mobile device 704 (e.g., a geofence, a purchase amount limit, a time limitation, a merchant limitation, a zip code use limitation, product code limits, limits that the mobile wallet can be used on, etc.). The mobile wallet computing system 706 then stores those rules in a mobile wallet database (e.g., similar to the mobile wallet database 410 of the mobile wallet computing system 106). It should be understood, however, that the order of processes 1208, 1210, 1212, 1214, and 1216 may differ in certain embodiments. For example, the secondary user may submit the rules at the same time the secondary party provides the information relating to the usable object to the mobile wallet computing system 106 or at the same time the secondary user provides the instruction to push the usable object to the user mobile wallet to the mobile wallet computing system 106.

At process 1218, whether the activation/deactivation condition(s) defined by the rule(s) for the usable object are fulfilled is determined. Moreover, at process 1220, in response to the rule(s) being fulfilled, the usable object is activated or deactivated in the user's mobile wallet. In various arrangements, processes 1218 and 1220 occur similarly to processes 1010 and 1012 described above with reference to FIG. 10.

FIGS. 13-18 depict graphic user interfaces that may be shown to a secondary user (shown in FIGS. 13-18 as "User A") during a process of pushing a usable object provisioned to the secondary user's mobile wallet 1300 to a user's mobile wallet, according to example embodiments. In particular, FIGS. 13-18 include example screenshots that a secondary user may observe while using the mobile wallet 1300 on a mobile device, such as on the display 804 of the secondary user mobile device 704, as part of the system 700.

Figure 13:
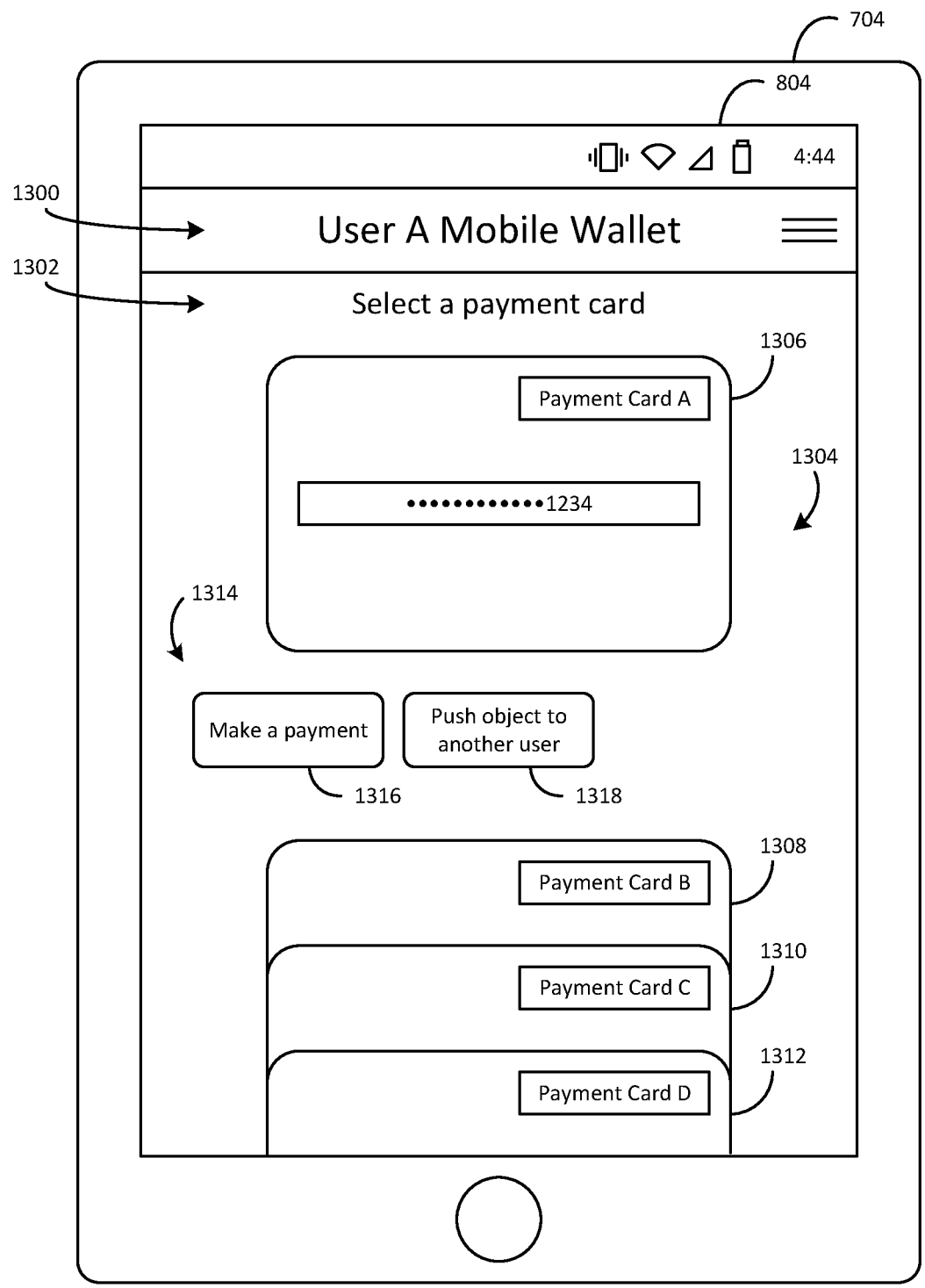
FIGS. 13-18 are graphical user interfaces shown to a secondary user pushing a usable object to another mobile wallet via the system of FIG. 7, according to example embodiments.

Referring to FIG. 13, an example screenshot of a payment card selection page 1302 in the secondary user's mobile wallet 1300 is shown. The payment card selection page 1302 includes a group of payment cards 1304 that the secondary user has provisioned to the mobile wallet 1300. In the example of FIG. 13, the group of payment cards 1304 includes card 1306 ("Payment Card A"), card 1308 ("Payment Card B"), card 1310 ("Payment Card C"), and card 1312 ("Payment Card D"). As shown in FIG. 13, the secondary user has selected Payment Card A from the group of payment cards 1304. Accordingly, the page 1302 includes a section 1314 for Payment Card A that includes two buttons: a button 1316 that the secondary user can press to make a payment using Payment Card A and a button 1318 that the secondary user can press to push Payment Card A to another mobile wallet user.

Figure 14:
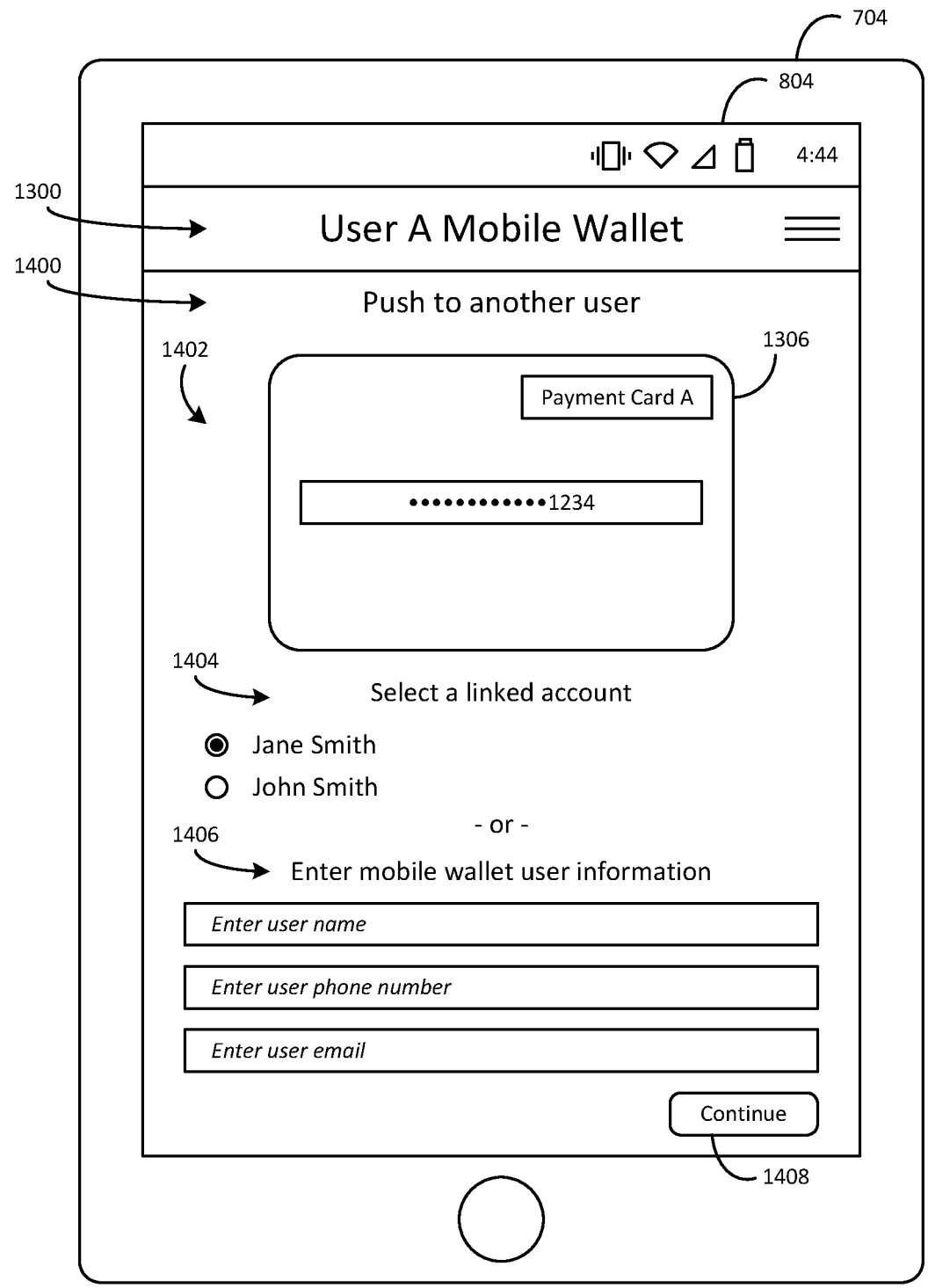
Figure 15:
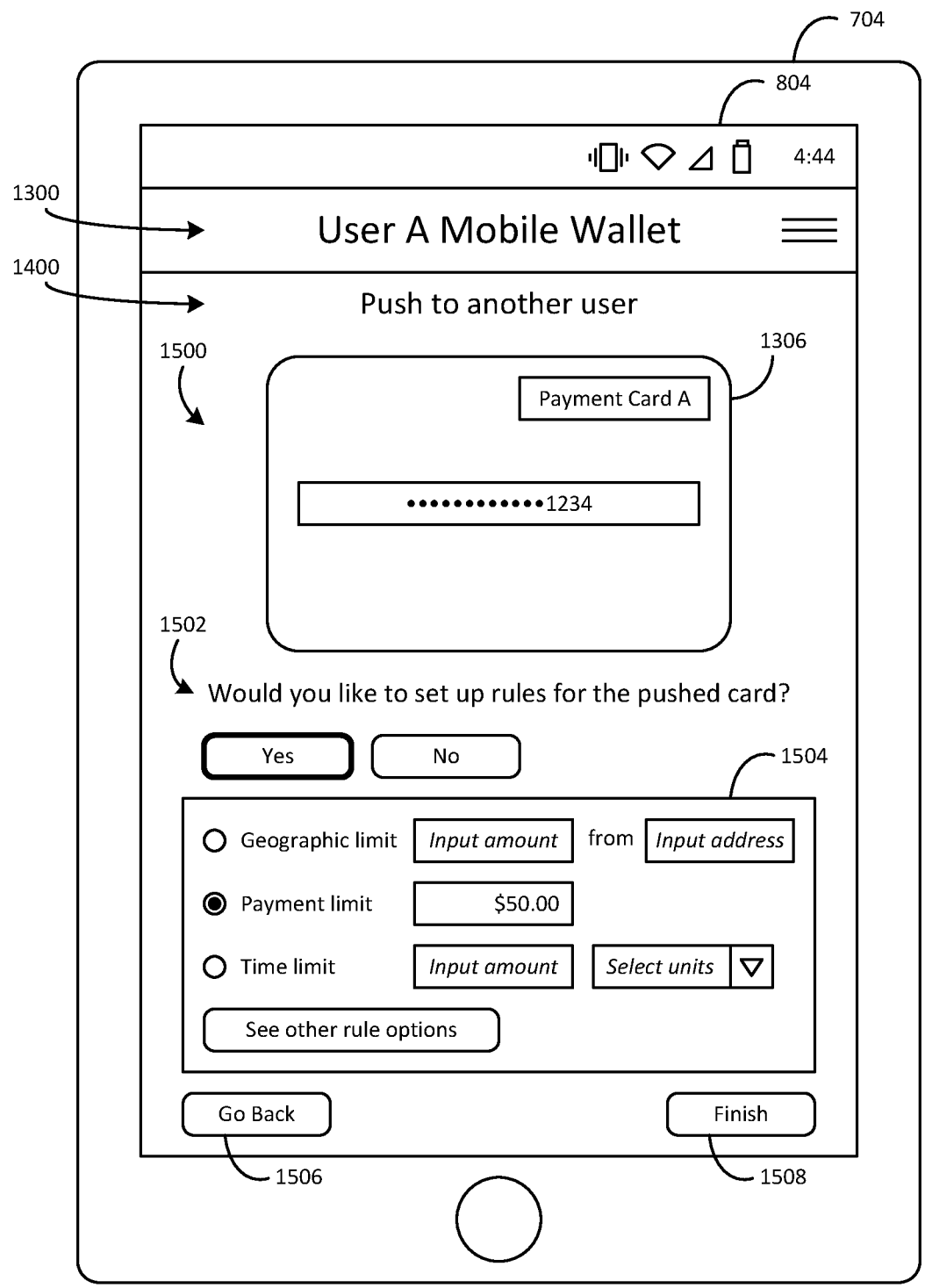

Referring now to FIGS. 14 and 15, example screenshots of a page 1400 allowing the secondary user to push Payment Card A to another user is shown. For example, if the secondary user selects button 1318 from FIG. 13, the secondary user may be redirected to the pushing configuration page 1400. As illustrated in FIG. 14, the pushing configuration page 1400 includes a first screen 1402 for selecting the mobile wallet account to which Payment Card A should be pushed. The selection screen 1402 includes two sections. In section 1404, the secondary user can select a mobile wallet account to which the secondary user's mobile wallet account is linked. Alternatively, in section 1406, the secondary user can enter in biographical information for the mobile wallet user to whom the secondary user would like to push Payment Card A. In the example of FIG. 14, the secondary user has selected the linked mobile wallet account for "Jane Smith" for pushing Payment Card A to in section 1404. The selection screen 1402 also includes a button 1408 that the secondary user can press to continue configuring pushing Payment Card A. For example, pressing the continue button 1408 directs the secondary user to the screenshot shown in FIG. 15.

As illustrated in FIG. 15, the pushing configuration page 1400 also displays a screen 1500 for setting up rules for the pushed payment card. As shown, the rules configuration screen 1500 includes a section 1502 whereby the secondary user can select whether the secondary user would like to set up rules for the pushed card. In the example of FIG. 15, the secondary user has selected "Yes" indicating that the user would like to set up rules for Payment Card A as pushed to Jane Smith's mobile wallet. Accordingly, the rules configuration screen 1500 also includes a section 1504 whereby the secondary user can input one or more rules for Payment Card A. As illustrated, the rules section 1504 displays several rules options from which the secondary user can select in configuring the rules for Payment Card A. In the example of FIG. 15, the rules options shown to the secondary user include (a) a geographic limit for which the secondary user can input an amount (e.g., a radius) from an address outside of which Payment Card A will be deactivated, (b) a payment limit for which the secondary user can input a payment amount over which Payment Card A will be deactivated, and (c) a time limit for which the secondary user can input an amount and units of time over which Payment Card A will be deactivated.

The rules section 1504 also includes a button 1506 that the secondary user can press to view other rules options (e.g., in response to which the secondary user will be redirected to another screen with additional rules options that the secondary user can select from). Accordingly, those of skill in the art will understand that the rule options shown in the rules section 1504 are merely potential rules options. For example, while the rules options shown in FIG. 15 are all limits in response to which the payment card will be deactivated in the user's mobile wallet, in other embodiments, the secondary user may be able to configure rules in response to which the payment card will be activated in the user's mobile wallet. Moreover, the secondary user may be able to configure different types of rules, such as rules limiting the time of day during which the payment card will be active, merchants that the payment card can be used to make purchases from, products that the payment card can be used to purchase, and so on. In the example of FIG. 15, the secondary user has selected a payment limit of $50.00 as the rule for Payment Card A.

The rules configuration screen 1500 also includes a button 1506 that the secondary user can press to go back to the selection screen 1402 (e.g., as shown in FIG. 14) and a button 1508 that the secondary user can press to finish the pushing configuration process. As an example, if the secondary user presses the finish button 1508, the secondary user mobile device 704 submits the selection information and rules information to the mobile wallet computing system 706, which then provisions Payment Card A to Jane Smith and stores the $50.00 payment limit rule.

Figure 16:
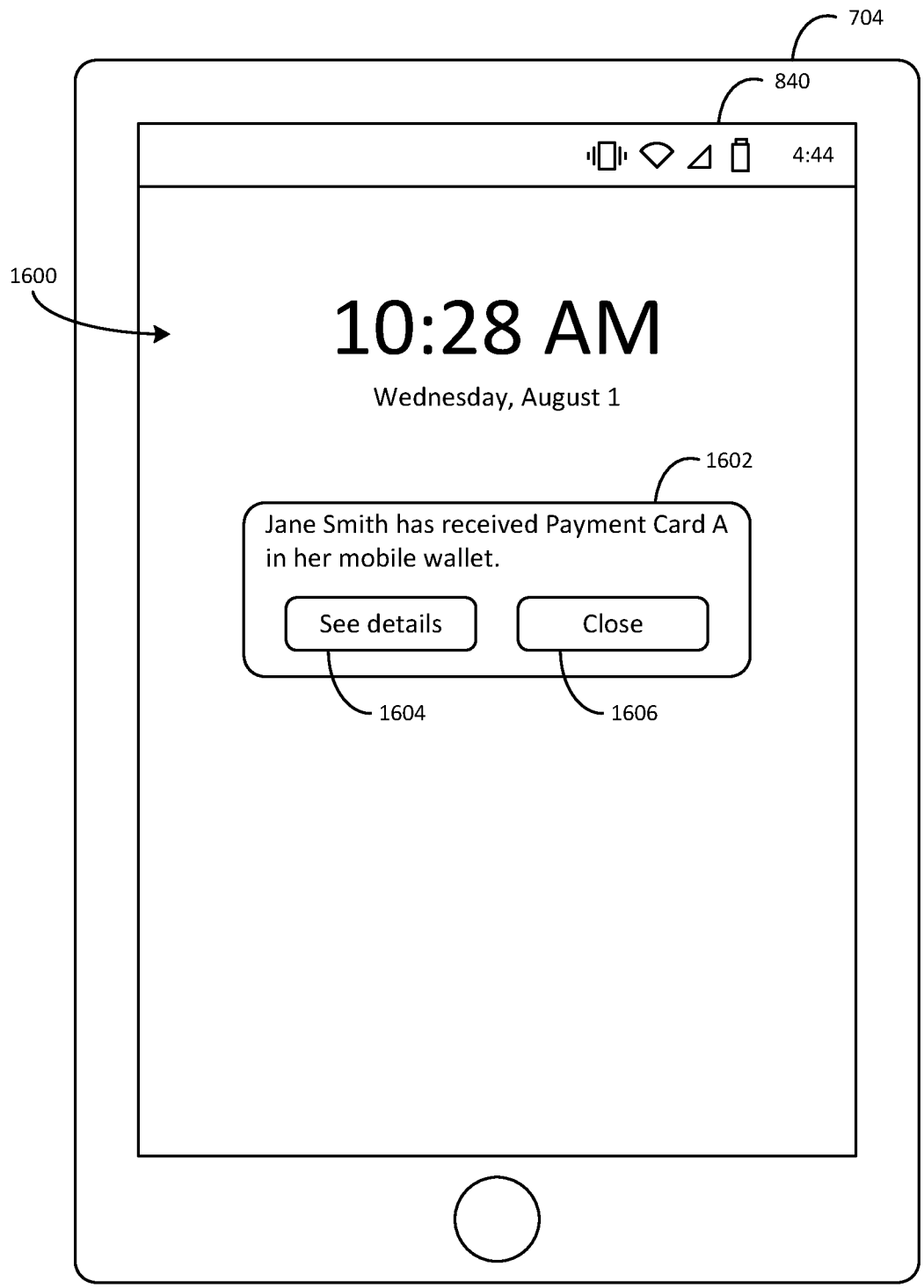
Figure 17:
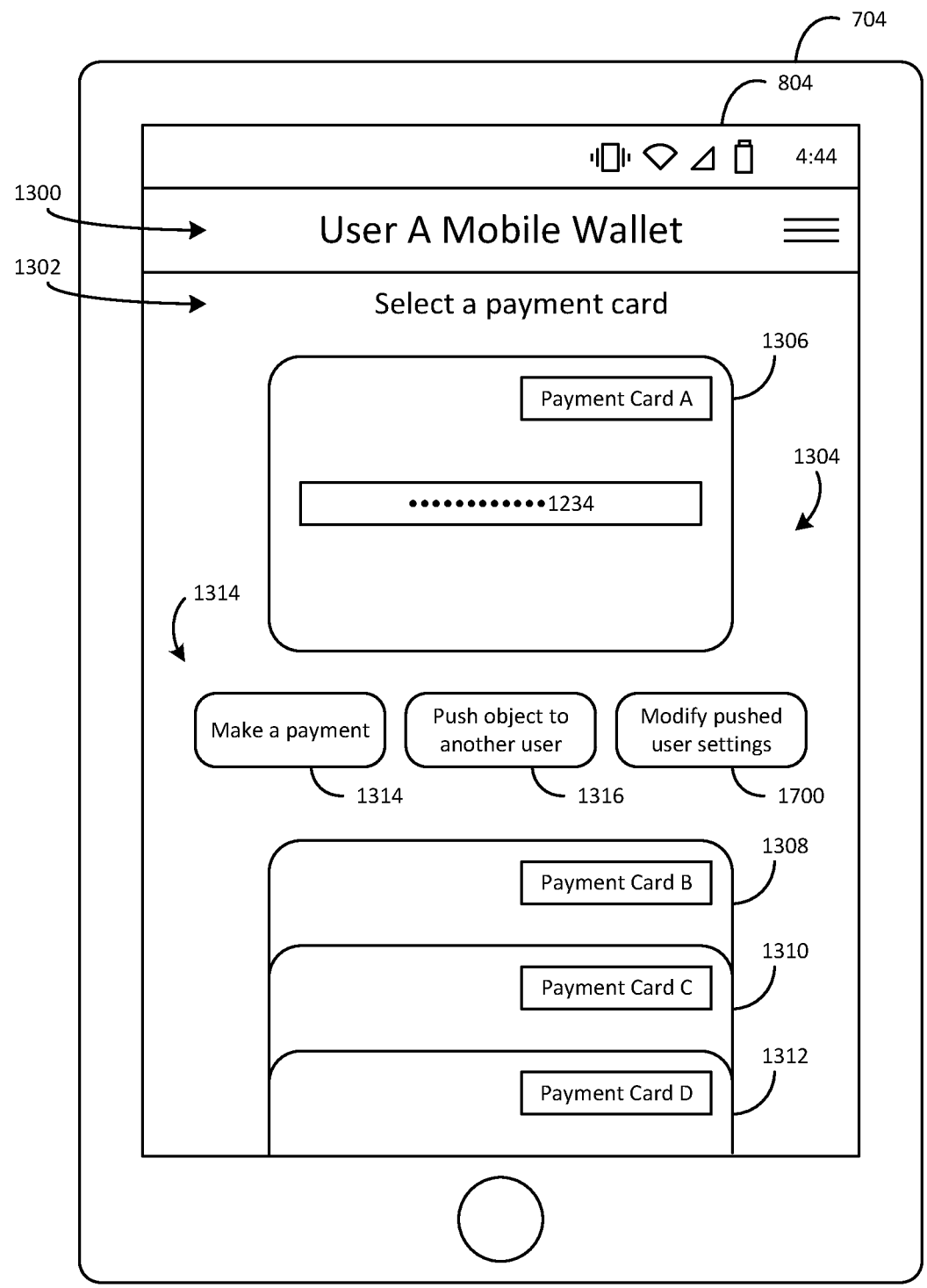

Referring now to FIG. 16, an example screenshot of a home screen 1600 of the secondary user mobile device 704 is shown. The home screen 1600 includes a push notification 1602 notifying the secondary user that Jane Smith has received Payment Card A in her mobile wallet. As shown, the push notification 1602 also includes a button 1604 that the secondary user can press to see more details about the notification and a button 1606 that the user can press to close the push notification 1602. As an example, if the secondary user presses the details button 1604, the user may be taken to the payment card selection page 1302 shown in FIG. 17. As shown in FIG. 17, Payment Card A has again been selected from the group 1304. However, now that Payment Card A has been provisioned to Jane Smith's mobile wallet, the Payment Card A section 1314 also displays a button 1700 that the secondary user can press to view and modify the pushed user settings for Payment Card A.

Referring now to FIG. 18, an example screenshot of a page 1800 allowing the secondary user to view pushed user settings for Payment Card A is shown. For instance, the secondary user may be directed to the pushed user settings page 1800 after selecting the button 1700 shown in FIG. 17. As shown in FIG. 18, the pushed user settings page 1800 allows the secondary user to view the mobile wallet users to which the payment card, in this case Payment Card A, has been pushed. Accordingly, the page 1800 includes one or more sections 1802, each associated with a user to whom the payment card has been pushed and settings for the payment card in the user's mobile wallet. In the example of FIG. 18, the pushed user settings page 1800 includes only one section 1802, which is for Jane Smith (e.g., the mobile wallet user selected for the Payment Card A to be pushed to in FIG. 14). The section 1802 includes a toggle 1804, which the secondary user can switch between "Activate" and "Deactivate." In FIG. 18, the toggle 1804 has been switched to "Activate," which is reflected by the fact that Jane Smith is indicated as a currently activated user in the section 1802. In various arrangements, in response to the secondary user switching the toggle from "Activate" to "Deactivate" or from "Deactivate" to "Activate," the mobile wallet application 806 on the secondary user mobile device 704 is configured to transmit the change in activation status to the mobile wallet computing system 706. The mobile wallet computing system 706 then deactivates or activates the usable object accordingly.

Further, the section 1802 includes a rules subsection 1806 that lists the rules that the secondary user has configured for the payment card in the user's wallet. In the example of FIG. 18, only one rule has been configured for Payment Card A, which is that Payment Card A should be deactivated in response to Jane Smith using Payment Card A for a payment request of $50.00 or more (e.g., as configured in FIG. 16). The rules subsection 1806 also includes a button 1808 that the secondary user can press to modify the rules for Payment Card A. For example, if the secondary user presses the edit rules button 1808, the secondary user may be redirected to a screen listing a variety of rules that the secondary user can select and input values for (e.g., similar to the rules section 1504 shown in FIG. 15).

Additionally, as shown in FIG. 18, the page 1800 may include several buttons enabling the secondary user to modify the users that have access to the Payment Card A. For example, as shown, the page 1800 may include a button 1810 enabling the secondary user to add Payment Card A to the mobile wallet of another user (e.g., redirecting the secondary user to the pushing configuration page 1400 shown in FIGS. 14 and 15). The pushed user settings page 1800 may also include a button 1812 enabling the secondary user to delete Payment Card A from the mobile wallet of another user (e.g., in response to which the mobile wallet computing system 706 deletes Payment Card A from the user's mobile wallet and/or otherwise prevents Payment Card A from being used to make a payment on the user's behalf). The page 1800 also includes a button 1814 that the secondary user can press to indicate that the secondary user has finished viewing the information shown on the page and making changes (e.g., redirecting the secondary user back to the payment card selection page 1302 as shown in FIG. 17).

However, it should be understood that FIGS. 13-18 depict example graphic user interfaces that may be shown to a secondary user as part of the secondary user pushing a usable object to another user's mobile wallet. In other embodiments, the secondary user may be shown more, fewer, or different graphic user interfaces that those shown in FIGS. 13-18. For example, the secondary user may be shown a different type of notification than the push notification 1602 shown in FIG. 16 or may be shown notifications in response to different events (e.g., the secondary user may be provided a notification when the user makes a payment using a provisioned payment card). As another example, the secondary user may push the usable object to the user's mobile wallet and subsequently configure the rules for the pushed usable object, rather than configuring the rules during the pushing process as shown in FIG. 15. Additionally, the secondary user may view graphic user interfaces for pushing the usable object to the user's mobile wallet in a setting outside of the mobile wallet, such as through a web application running on the secondary user mobile device 704. Moreover, in various embodiments, the secondary user's mobile wallet 1300 may include other usable objects aside from payment cards.

It should further be understood that while FIGS. 13-18 are described with reference to a secondary user and system 700, in other embodiments, similar graphic user interfaces may be shown to a different provisioning party such as a third party provisioning a usable object such as a payment card through the system 100. As an example, the third party may view graphic user interfaces on a web browser or other web application running on the third party computing system 104 as part of provisioning a usable object to a user's mobile wallet. The graphic user interfaces may include a section for entering biographic information similar to section 1406 shown in FIG. 14 and a section for inputting rules for the usable object similar to section 1504 shown in FIG. 15.

Figure 19:
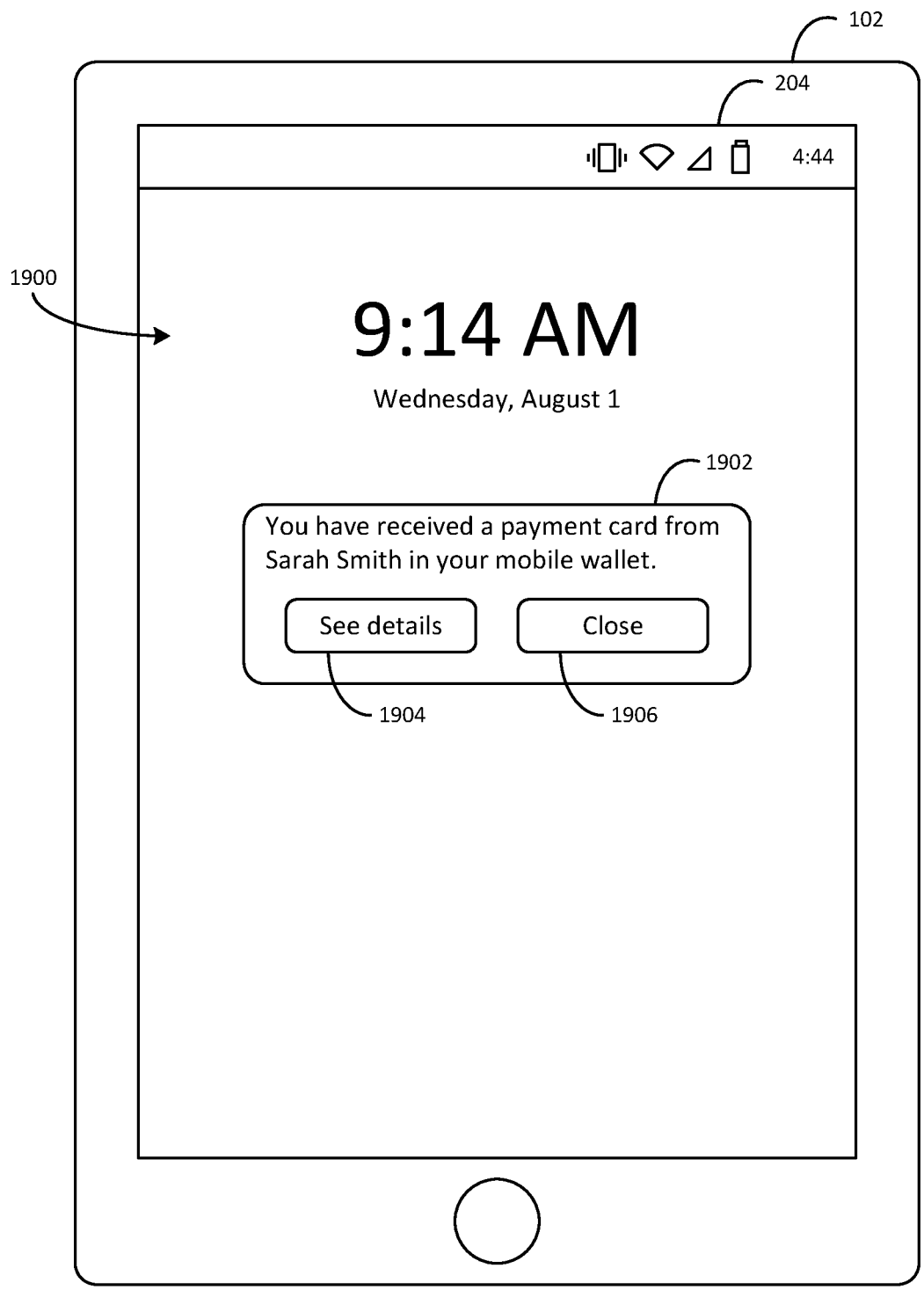
FIGS. 19-21 are graphical user interfaces shown to a user receiving a usable object via the system of FIG. 1, according to example embodiments.
Figure 20:
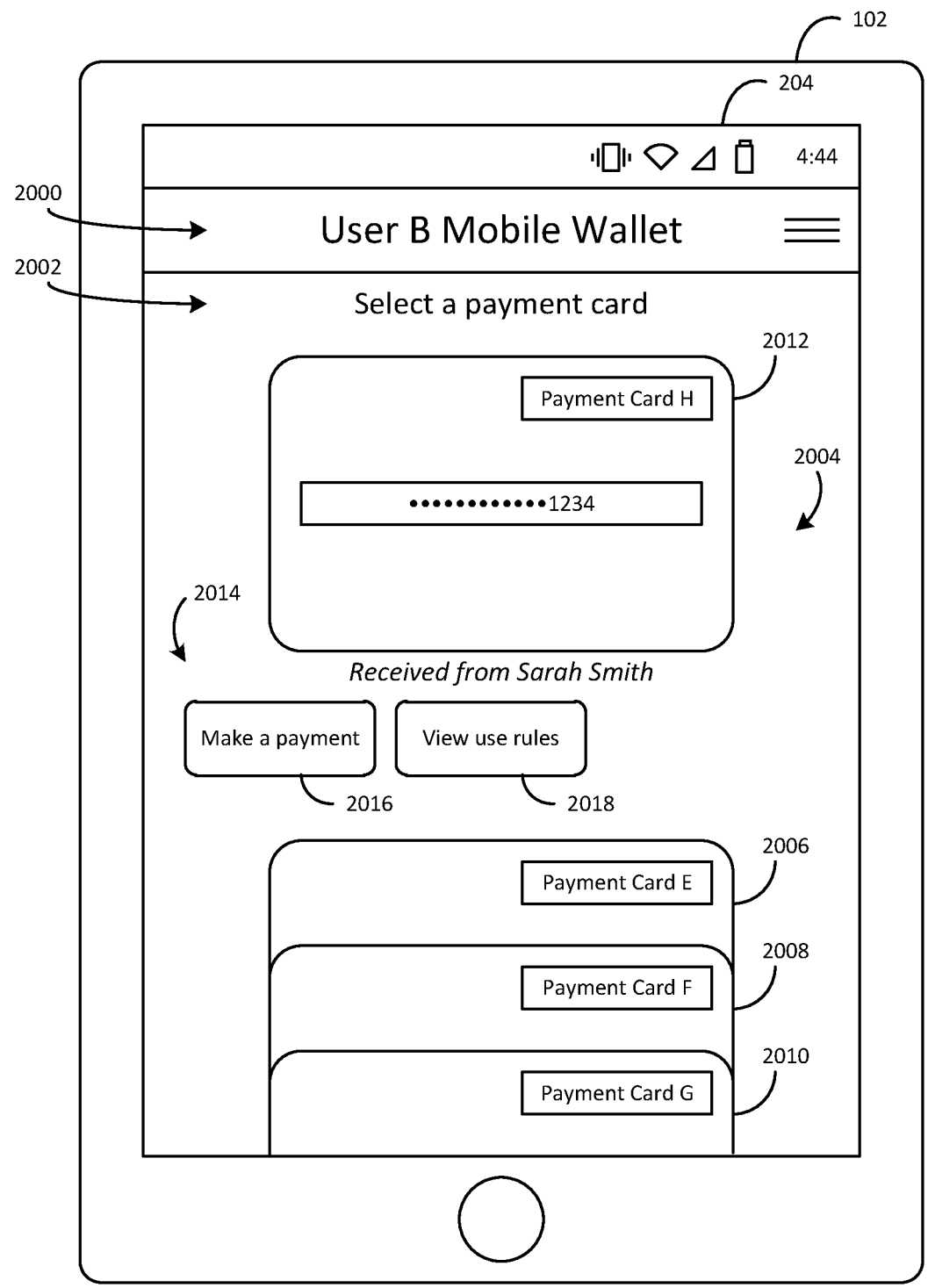
Figure 21:
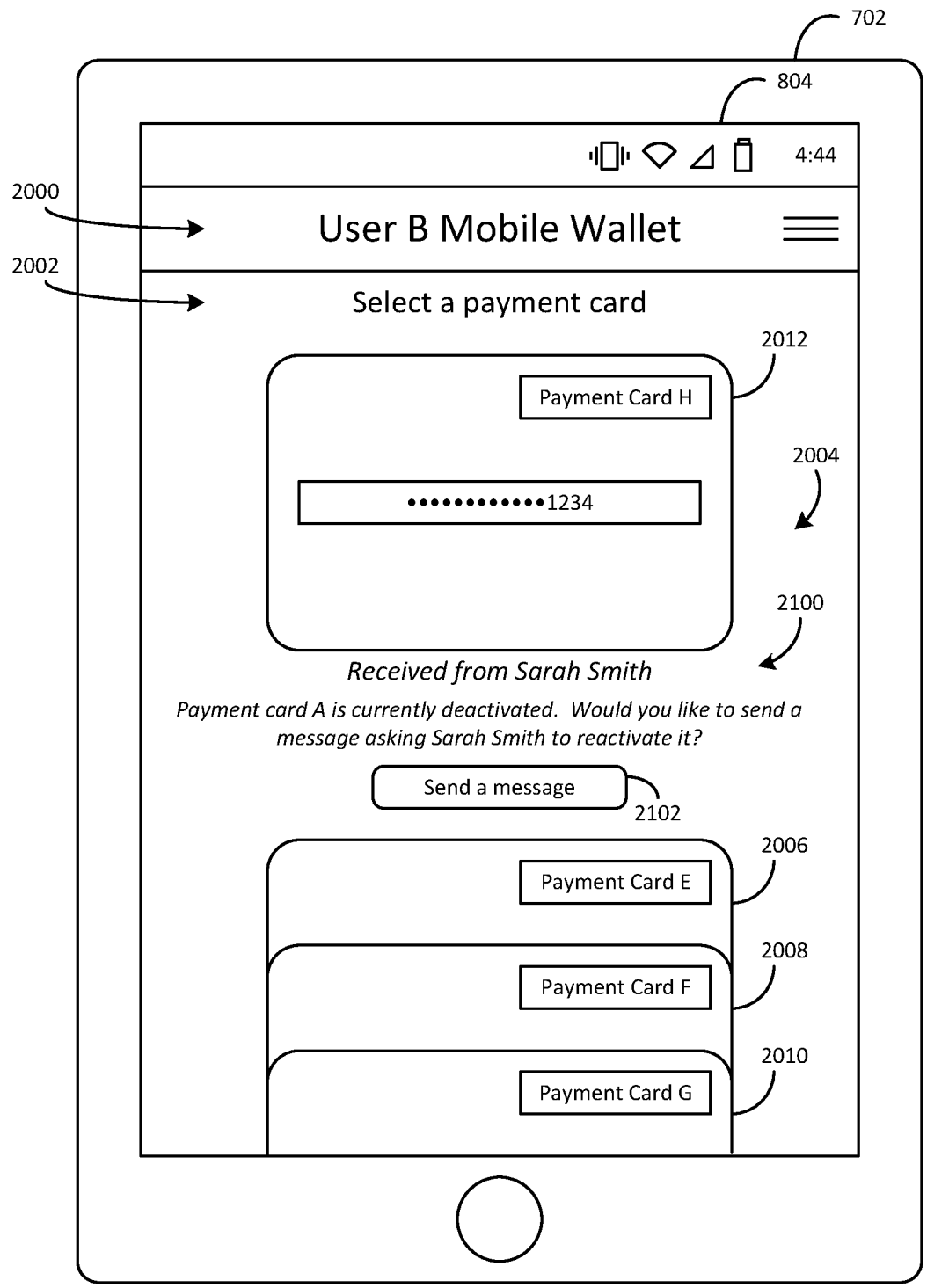

FIGS. 19-21 depict graphic user interfaces that may be shown to a user (shown in FIGS. 19-21 as "User B") who has received a usable object in a mobile wallet 2000, according to example embodiments. More particularly, FIGS. 19-21 include example screenshots that a secondary user may observe while using the mobile wallet 2000 on a mobile device, such as the display 204 of the user mobile device 102, as part of the system 100. However, it should be understood that, in various embodiments, similar graphic user interfaces may be shown to a user who has received a usable object from a different provisioning party such as a secondary user as part of the system 700. Referring to FIG. 19, an example screenshot of a home screen 1900 of the user mobile device 102 is shown. The home screen 1900 includes a push notification 1902 notifying the user that the user has received a payment card from Sarah Smith in the user's mobile wallet 2000. As shown, the push notification 1902 includes a button 1904 that the user can press to see more details about the notification and a button 1906 that the user can press to close the push notification 1902.

Referring now to FIG. 20, an example screenshot of a payment card selection page 2002 on the user's mobile wallet 2000 is shown, according to an example embodiment. For example, if the user presses the details button 1904 shown in FIG. 19, the user is taken to the payment card selection page 2002. As illustrated in FIG. 20, in various arrangements, the payment card selection page 2002 is similar to the payment card selection page 1302 described above with reference to FIGS. 13-18. As shown, the payment card selection page 2002 includes a group of payment cards 2004 that the user has provisioned to the user's mobile wallet 2000, has received from third parties (e.g., individuals or organizations without mobile wallet accounts), or has received from other mobile wallet users (e.g., secondary users). In the example of FIG. 20, the group of payment cards 2004 includes card 2006 ("Payment Card E"), card 2008 ("Payment Card F"), and card 2010 ("Payment Card G"). Additionally, the group of payment cards 2004 includes card 2012 ("Payment Card H"), which the user has received from a third party or secondary user (e.g., in the example of FIG. 21, from "Sarah Smith"). As shown, the user has selected Payment Card H, and accordingly the payment card selection page 1302 includes a section 2014 for Payment Card H. In the example of FIG. 20, the Payment Card H section 2014 includes two buttons: a button 2016 that the user can press to make a payment using Payment Card H and a button 2018 that the user can press to view use rules for Payment Card H (e.g., as configured for Payment Card H by Sarah Smith using a similar process as described above with respect to FIG. 15).

Referring now to FIG. 21, an example screenshot of a payment card selection page 2002 on the user's mobile wallet 2000 is shown, according to an example embodiment. The payment card selection page 2002 shown in FIG. 21 is similar to the page 2002 shown in FIG. 20. However, in FIG. 21, Payment Card H has been deactivated in the user's mobile wallet 2000, as shown by a section 2100 for Payment Card H. For example, Sarah Smith (e.g., the third party or secondary user who provisioned Payment Card H to the user's mobile wallet 2000) may have manually deactivated Payment Card H. As another example, rules for Payment Card H may have been fulfilled such that the mobile wallet computing system 106 has disabled payments using Payment Card H. As shown, the Payment Card H section 2100 also includes a button 2102 that the user can press to send a message to Sarah Smith requesting that Sarah Smith activate Payment Card H for the user (e.g., by manually activating Payment Card H, by modifying rules for Payment Card H such that Payment Card H is reactivated in the user's mobile wallet 2000).

Those of skill in the art will understand, however, that FIGS. 19-21 depict example graphic user interfaces that may be shown to a user as part of a usable object being provisioned to a mobile wallet of a user by a third party or secondary user. In other embodiments, the user may be shown more, fewer, or different graphic user interfaces than those shown in FIGS. 19-21. For example, the use may be shown a different type of notification than the push notification 1902 shown in FIG. 19 or may be shown notifications in response to different events (e.g., in response to Payment Card H being activated or deactivated in the user's mobile wallet 2000). As another example, the user may be shown additional options for a payment card that has been provisioned to the user's mobile wallet other than the "Make a payment" button 2016 and the "View payment rules" button 2018, such as an option for sending the third party or secondary user that provisioned the payment card a message (e.g., to thank the third party or secondary user for provisioning the payment card).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include machine or computer-readable media that are executable by one or more processors (e.g., multiple remote processors connected to each other through any type of network). The machine-readable media may include code, which may be written in any programming language, including, but not limited to, Java or the like and any conventional procedural programming languages, such as the "C" programming language or similar programming languages. Alternatively, the term "circuit" may include hardware structured to execute the functions described herein, and in some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, or XNOR), resistors, multiplexers, registers, capacitors, inductors, diodes, wiring, and so on. Thus, a circuit may also include programmable hardware devices such as field programmable gate arrays, programmable array logic programmable logic devices, or the like.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, and the like. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), and the like. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, and the like. In some embodiments, the volatile storage media takes the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, is structured to communicate data over a network (e.g., the network 112 or the network 712) includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 112. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
   receiving, by a mobile wallet computing system from a first computing system, information relating to a usable payment object from a first party associated with a first mobile wallet application;
   receiving, by the mobile wallet computing system via a communication session, authentication information of a second mobile wallet application associated with a second computing system, wherein the communication session is between the first computing system and the second computing system, and wherein the second computing system is associated with a second party;
   in response to determining the first computing system and second computing system are proximate to each other based on the received authentication information from the communication session, provisioning, by the mobile wallet computing system, the usable payment object to a second mobile wallet application of the second computing system;
   receiving, by the mobile wallet computing system from the first computing system, one or more rules relating to the usable payment object from the first party, wherein the one or more rules define an activation condition for the usable payment object and a deactivation condition for the usable payment object, the deactivation condition defining a purchase limit or a product limit of the usable payment object;
   monitoring, by the mobile wallet computing system, a context of the second mobile wallet application based on interfacing with the second computing system, wherein interfacing with the second computing system comprises accessing the geographic location of the second computing system;
   determining, by the mobile wallet computing system, the geolocation location of the second computing system;
   automatically determining, by the mobile wallet computing system, that the activation condition is fulfilled based on the geolocation location of the second computing system being within a geographic distance of the first computing system;
   in response to the activation condition for the usable payment object being fulfilled, activating, by the mobile wallet computing system, the usable payment object including pushing the activation to a display of the second computing system in the second mobile wallet application;
   receiving, by the mobile wallet computing system from a point-of-sale (POS) device, a mobile wallet transaction associated with the usable payment object;
   determining, by the mobile wallet computing system, that the purchase limit or the product limit of the usable payment object is met; and
   in response to the deactivation condition for the usable payment object being met, automatically deactivating, by the mobile wallet computing system, the usable payment object including pushing the deactivation to the display of the second computing system in the second mobile wallet application, wherein automatically deactivating comprises modifying access to the usable payment object in the second mobile wallet application.

2. The method of claim 1, wherein provisioning the usable payment object to the mobile wallet of the user comprises:
in response to receiving the information relating to the usable payment object, provisioning, by the mobile wallet computing system, the usable payment object to the first mobile wallet application of the first party.

3. The method of claim 2, further comprising:
receiving, by the mobile wallet computing system, a request from at least one of the first party or the second party to link one or more mobile wallet accounts of the first party or the second party; and
in response to the request, linking, by the mobile wallet computing system, the one or more mobile wallet accounts of the first party or the second party;
wherein receiving the request to provision the usable payment object comprises receiving, by the mobile wallet computing system, a selection from the second party of the linked one or more mobile wallet accounts.

4. The method of claim 1, further comprising:
receiving, by the mobile wallet computing system, a request to deactivate the usable payment object in the second mobile wallet application of the second party from the first party, wherein the usable payment object in the second mobile wallet application of the second party is deactivated in response to the deactivation condition for the usable payment object being fulfilled based on the purchase limit or a product limit being met or in response to the request.

5. The method of claim 1, wherein monitoring the context of the second mobile wallet application comprises:
interfacing, by the mobile wallet computing system, with the second computing system; and
monitoring, by the mobile wallet computing system, the context of the second mobile wallet application through at least one of an application running on the the second computing system or a functionality of the the second computing system.

6. The method of claim 1, wherein the usable payment object is a payment card.

7. A mobile wallet computing system comprising:
a network interface structured to communicate data over a network;
a processor; and
a memory coupled to the processor and comprising non-transitory machine readable storage media having instructions stored thereon that, when executed by the processor, cause the mobile wallet computing system to:
receive, from a first computing system, information relating to a usable payment object from a first party associated with a first mobile wallet application;
receive, via a communication session, authentication information of a second mobile wallet application associated with a second computing system, wherein the communication session is between the first computing system and the second computing system, and wherein the second computing system is associated with a second party;
in response to determining the first computing system and second computing system are proximate to each other based on the received authentication information from the communication session, provision the usable payment object to a second mobile wallet application of the second computing system;
receive, from the first computing system, one or more rules relating to the usable payment object from the first party, wherein the one or more rules define an activation condition and a deactivation condition for the usable payment object such that when the activation condition is fulfilled the usable payment object is active in the mobile wallet of the user, and wherein the deactivation condition defines a purchase limit or a product limit of the usable payment object;
monitor a context of the second mobile wallet application based on interfacing with the second computing system, wherein interfacing with the second computing system comprises accessing the geographic location of the second computing system;
determine the geolocation location of the second computing system;
automatically determine that the activation condition for the usable payment object is fulfilled based on the geolocation location of the second computing system being within a geographic distance of the first computing system;
in response to the activation condition for the usable payment object being fulfilled, activate the usable payment object including pushing the activation to a display of the second computing system in the second mobile wallet application;
receive, from a point-of-sale (POS) device, a mobile wallet transaction associated with the usable payment object;
determine that the purchase limit or the product limit of the usable payment object is met; and
in response to the deactivation condition for the usable payment object being met, automatically deactivate the usable payment object including pushing the deactivation to the display of the second computing system in the second mobile wallet application of, wherein automatically deactivating comprises modifying access to the usable payment object in the second mobile wallet application.

8. The mobile wallet computing system of claim 7, wherein the instructions cause the mobile wallet computing system to provision the usable payment object to the mobile wallet of the user by:
in response to receiving the information relating to the usable payment object, provisioning the usable object to the mobile wallet of the second user.

9. The mobile wallet computing system of claim 8, wherein the instructions further cause the mobile wallet computing system to:
receive a request from at least one of the first party or the second party to link one or more mobile wallet accounts of the first party or the second party; and
in response to the request, link the mobile wallet accounts of the first party or the second party;
wherein the instructions cause the mobile wallet computing system to receive the request to provision the usable payment object as a selection from the second party of the linked one or more mobile wallet accounts.

10. The mobile wallet computing system of claim 7, wherein the instructions further cause the mobile wallet computing system to:
receive a request from the party to deactivate the usable payment object in the second mobile wallet application of the user, wherein the usable payment object in the second mobile wallet application of the second party is deactivated in response to the deactivation condition for the usable payment object being fulfilled based on the purchase limit or a product limit being met or in response to the request.

11. The mobile wallet computing system of claim 7, wherein the instructions cause the mobile wallet computing system to monitor the context of the second mobile wallet application by:
   interfacing with a mobile device associated with the second computing system; and
   monitoring the context of the second mobile wallet application through at least one of an application running on the the second computing system or a functionality of the the second computing system.

12. The mobile wallet computing system of claim 7, wherein the usable payment object is a payment card.

13. A mobile device associated with a user, comprising:
   a display;
   a processor; and
   a memory comprising non-transitory machine readable storage media having a mobile wallet application associated with a mobile wallet held by the user stored thereon, the memory coupled to the processor, and the mobile wallet application including instructions executable by the processor that are structured to cause the processor to:
   receive, from a first computing system, information relating to a usable payment object from a first party associated with a first mobile wallet application;
   receive, via a communication session, authentication information of a second mobile wallet application associated with a second computing system, wherein the communication session is between the first computing system and the second computing system, and wherein the second computing system is associated with a second party;
   in response to determining the first computing system and second computing system are proximate to each other based on the received authentication information from the communication session, provision the usable payment object to a second mobile wallet application of the second computing system;
   receive, from the first computing system, one or more rules relating to the usable payment object from the first party, wherein the one or more rules define an activation condition and a deactivation condition for the usable payment object such that when the activation condition is fulfilled the usable payment object is active in the mobile wallet of the user, and wherein the deactivation condition defines a purchase limit or a product limit of the usable payment object;
   monitor a context of the second mobile wallet application based on interfacing with the second computing system, wherein interfacing with the second computing system comprises accessing the geographic location of the second computing system;
   determine the geolocation location of the second computing system;
   automatically determine that the activation condition for the usable payment object is fulfilled based on the geolocation location of the second computing system being within a geographic distance of the first computing system;
   in response to the activation condition for the usable payment object being fulfilled, activate the usable payment object including pushing the activation to a display of the second computing system in the second mobile wallet application;
   receive, from a point-of-sale (POS) device, a mobile wallet transaction associated with the usable payment object;
   determine that the purchase limit or the product limit of the usable payment object is met; and
   in response to the deactivation condition for the usable payment object being met, automatically deactivate the usable payment object including pushing the deactivation to the display of the second computing system in the second mobile wallet application, wherein automatically deactivating comprises modifying access to the usable payment object in the second mobile wallet application.

14. The mobile device of claim 13, wherein one or more mobile wallets accounts of the first party or the second party are linked by a mobile wallet computing system.

15. The mobile device of claim 13, wherein the instructions further cause the processor to:
   transmit information relating to the monitored context to a mobile wallet computing system; and
   receive an indication from the mobile wallet computing system to activate the usable payment object in the second mobile wallet application based on the monitored context information;
   wherein the instructions cause the processor to activate the usable payment object in response to receiving the indication from the mobile wallet computing system.

16. The mobile device of claim 13, wherein the instructions further cause the processor to:
   receive the one or more rules relating to the usable payment object; and
   determine whether the activation condition defined by the one or more rules is fulfilled;
   wherein the instructions cause the processor to activate the usable payment object in the second mobile wallet application in response to determining that the one or more rules are fulfilled.

17. The mobile device of claim 13, wherein the mobile device further includes a near-field communication (NFC) device;
   wherein the instructions further cause the processor to establish an NFC communication session with the first computing system associated with the first party; and
   wherein the instructions cause the processor to receive the usable payment object from the the first computing system of the first party via the NFC communication session.

18. The mobile device of claim 13, wherein the usable payment object is a payment card.

* * * * *